(12) United States Patent
Bar-Aviv et al.

(10) Patent No.: US 8,582,916 B2
(45) Date of Patent: Nov. 12, 2013

(54) NOISE REDUCTION OF IMAGES

(75) Inventors: Ezer Bar-Aviv, Tiberias (IL); Eliran Dahan, Haifa (IL); Zvi Devir, Haifa (IL); Tal Kenig, Avihail (IL); Guy Rosman, Haifa (IL)

(73) Assignee: Medic Vision—Brain Technologies Ltd., Haifa (IL)

( * ) Notice: Subject to any disclaimer, the term of this patent is extended or adjusted under 35 U.S.C. 154(b) by 625 days.

(21) Appl. No.: 12/810,322

(22) PCT Filed: Dec. 25, 2008

(86) PCT No.: PCT/IL2008/001679
§ 371 (c)(1),
(2), (4) Date: Jun. 24, 2010

(87) PCT Pub. No.: WO2009/081410
PCT Pub. Date: Jul. 2, 2009

(65) Prior Publication Data
US 2010/0272340 A1 Oct. 28, 2010

Related U.S. Application Data

(60) Provisional application No. 61/016,578, filed on Dec. 25, 2007.

(51) Int. Cl.
*G06K 9/40* (2006.01)

(52) U.S. Cl.
USPC ............ 382/275; 382/130; 382/128

(58) Field of Classification Search
None
See application file for complete search history.

(56) References Cited

U.S. PATENT DOCUMENTS

| 5,537,485 | A | * | 7/1996 | Nishikawa et al. | ........... | 382/130 |
| 5,598,481 | A | * | 1/1997 | Nishikawa et al. | ........... | 382/130 |
| 5,666,434 | A | * | 9/1997 | Nishikawa et al. | ........... | 382/128 |
| 5,673,332 | A | * | 9/1997 | Nishikawa et al. | ........... | 382/128 |

* cited by examiner

*Primary Examiner* — Tsung-Yin Tsai
(74) *Attorney, Agent, or Firm* — Mark M. Friedman

(57) ABSTRACT

A method of reducing noise in an image, comprising: a) for each pixel being examined in the image, selecting a set of search pixels; b) calculating a value of one or more features of a neighborhood of each search pixel, and a value of corresponding features of a neighborhood of the pixel being examined; and c) calculating a reduced noise grey value for each pixel being examined, based on raw or transformed grey values of its search pixels, with greater sensitivity to those with one or more feature values similar to those of the pixel being examined; wherein calculating the value of at least one feature comprises calculating a characteristic of a distribution of raw or transformed grey values of pixels in the neighborhood, other than a mean grey value of all pixels in the neighborhood.

18 Claims, 10 Drawing Sheets

US 8,582,916 B2

NOISE REDUCTION OF IMAGES

RELATED APPLICATION/S

This application is a National Stage of PCT/IL2008/001679 filed on Dec. 25, 2008, which claims benefit under 35 USC 119(e) from US provisional patent application 61/016,578, filed on Dec. 25, 2007.

The contents of all of the above documents are incorporated by reference as if fully set forth herein.

FIELD AND BACKGROUND OF THE INVENTION

The present invention, in some embodiments thereof, relates to a method of reducing noise in images and, more particularly, but not exclusively, to a method of reducing noise in medical images using nonlinear filters.
The following publications and patents relate generally to image processing noise reduction, image acquisition and/or computer vision.
US2007053477—Method and apparatus of global de-noising for cone beam and fan beam CT imaging
KR20050031210—Method and apparatus of image denoising
JP2000050109—Nonlinear image filter for removing noise
U.S. Pat. No. 6,459,755—Method and apparatus for administrating low dose CT scans
US2003099405—CT dose reduction filter with a computationally efficient implementation
EP1774837—Active dose reduction device and method
JP200139874—Magnetic field generator for MRI
WO2007047599—Method and apparatus for high gain magnetic resonance
G01V3/00, G01R33/34
Optimal Mass Transport for Registration and Warping, International Journal of Computer Vision, Volume 60, Issue 3 (December 2004), Pages: 225-240, Steven Haker, Lei Zhu, Allen Tannenbaum, Sigurd Angenent
A Metric for Distributions with Applications to Image Databases, ICIP 1998, Pages 59-66, Rubner Yossi, Tomasi Carlo, Guibas, J. Leonidas.
Shape Matching and Object Recognition Using Shape Contexts, IEEE T-PAMI, Volume 24, No. 4, (April 2002), Belongie Serge, Jitendra Malik, Puzicha Jan.
Matching 3D Models with Shape Distributions, Proceedings of the International Conference on Shape Modeling & Applications 2001, Pages 154-166, Robert Osada, Thomas Funkhouser, Bernard Chazelle, and David Dobkin
P. J. Burt, E. H. Adelson, "The Laplacian Pyramid as a Compact Image Code," IEEE Trans. on Communications, pp. 532-540, April 1983
Iddo Drori, Daniel Cohen-Or, Hezy Yeshurun, ACM Transactions on Graphics 22(3), (Proc. of SIGGRAPH 2003), 303-312.
John Goutsias and Henk J. A. M. Heijmans, "Nonlinear Multiresolution Signal Decomposition Schemes—Part I: Morphological Pyramids", IEEE Trans. on Image Processing, Vol. 9, No. 11, Nov. 2000.
John Goutsias and Henk J. A. M. Heijmans, "Nonlinear Multiresolution Signal Decomposition Schemes—Part II: Morphological Wavelets", IEEE Trans. on Image Processing, Vol. 9, No. 11, Nov. 2000.
Jean Serra, Image Analysis and Mathematical Morphology, 1982.

SUMMARY OF THE INVENTION

An aspect of some embodiments of the invention concerns a method of reducing noise of a pixel in an image by estimating its true grey value without noise, based on the grey values of other similar pixels, identified as similar by features of their neighborhoods. These include features that depend on a distribution function of grey levels of pixels in the neighborhood, or features that compare neighborhoods that are rotated or scaled relative to each other, or features that involve applying a transform or filter to the neighborhood that preferentially selects structures of an intermediate range of scales, or only of some orientations.

There is provided in accordance with an exemplary embodiment of the invention, a method of reducing noise in an image, comprising:

a) for each pixel being examined in the image, selecting a set of search pixels;

b) calculating a value of one or more features of a neighborhood of each search pixel, and a value of corresponding features of a neighborhood of the pixel being examined; and c) calculating a reduced noise grey value for each pixel being examined, based on raw or transformed grey values of its search pixels, with greater sensitivity to those with one or more feature values similar to those of the pixel being examined;

wherein calculating the value of at least one feature comprises calculating a characteristic of a distribution of raw or transformed grey values of pixels in the neighborhood, other than a mean grey value of all pixels in the neighborhood.

In an exemplary embodiment of the invention, calculating the value of the feature comprises calculating a second or higher moment of the distribution. Optionally or alternatively, the grey values of pixels in the neighborhood are raw grey values of the image for those pixels.

In an exemplary embodiment of the invention, the grey values of pixels in the neighborhood are grey values of the image transformed by a filter. Optionally, the filter is a Gaussian filter.

In an exemplary embodiment of the invention, calculating the value of the feature also comprises calculating at least one characteristic of a distribution of grey values of the pixels in a second neighborhood that is a proper sub-set of the neighborhood.

There is provided in accordance with an exemplary embodiment of the invention, a method of reducing noise in an image, comprising:

a) for each pixel being examined in the image, selecting a set of search pixels;

b) calculating a value of one or more features of a neighborhood of each search pixel, and a value of corresponding features of a neighborhood of the pixel being examined; and c) calculating a reduced noise grey value for each pixel being examined, based on raw or transformed grey values of its search pixels, with greater sensitivity to those with one or more feature values similar to those of the pixel being examined;

wherein calculating the value of at least one feature comprises evaluating a transform of the image in the neighborhood, or an effect of a filter on the image in the neighborhood, that preferentially selects structures of a range of scales intermediate between the size of the neighborhood and a few pixels, or of some orientations over other orientations, or both. Optionally, calculating the value of the feature comprises evaluating a response of a linear filter to the image. Optionally, the linear filter is a wavelet filter. Optionally or alternatively, the linear filter is a directional filter. Optionally, calculating the value of the feature comprises evaluating the effect of the filter in more than one direction.

In an exemplary embodiment of the invention, calculating the value of the feature comprises evaluating a nonlinear morphological transform of the image in the neighborhood. Optionally, the morphological transform is a multiscale transform. Optionally, the morphological transform is a morphological operator.

In an exemplary embodiment of the invention, the dependence of the value of the feature on angle of orientation of the neighborhood has a symmetry such that the value of the feature is substantially unchanged if the neighborhood is rotated by at least one angle, for any grey values of the image pixels in the neighborhood.

In an exemplary embodiment of the invention, for at least one feature, the corresponding feature of the pixel being examined and the search pixel are evaluated with their neighborhoods at different relative orientations or scales or both.

In an exemplary embodiment of the invention, the reduced noise grey value is based on a weighted average of grey values of the search pixels.

In an exemplary embodiment of the invention, the weighted average uses weights that depend on a measure of differences between the feature values of the search pixel and the corresponding feature values of the pixel being examined.

In an exemplary embodiment of the invention, the method includes:

a) identifying a relatively more structured portion of a residual image representing changes from the original image to the noise reduced image; and b) restoring the structured portion to the noise reduced image to produce an improved noise reduced image.

In an exemplary embodiment of the invention, the method includes including estimating a noise level of one or more of the search pixels, wherein the reduced noise grey value is less dependent on, or not dependent on, search pixels with higher estimated noise levels.

In an exemplary embodiment of the invention, the method includes:

a) assigning a patch of pixels in an image, represented as a vector of grey levels, to one out of a plurality of clusters in a vector space of the patches;

b) approximating the patch as a function of a reduced set of independent parameters, fewer than the number pixels in the patch, associated with said cluster; and c) correcting a grey level of a pixel of the patch according to a difference between the actual grey levels of the patch and the approximation of the patch as a function of the reduced set of independent parameters. Optionally, the function is a linear combination of a reduced set of basis vectors, and the independent parameters are the coefficients of the basis vectors in the linear combination.

There is provided in accordance with an exemplary embodiment of the invention, a method of obtaining a medical image with altered image acquisition parameters, comprising:

a) determining a set of one or more image acquisition parameters which would result in a desired noise level after noise reduction of the image;

b) acquiring the image with said acquisition parameters; and c) reducing the noise of the image according to any of the preceding claims.

Optionally, acquiring the image comprises acquiring a CT image, and determining the set of one or more image acquisition parameters comprises determining a set of parameters with reduced x-ray dose, compared to the case where noise of the image is not reduced. Optionally or alternatively, acquiring the image comprises acquiring an MRI image, and determining the set of one or more image acquisition parameters comprises determining a set of parameters with reduced static magnetic field or a reduced acquisition time, compared to the case where noise of the image is not reduced.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1A:
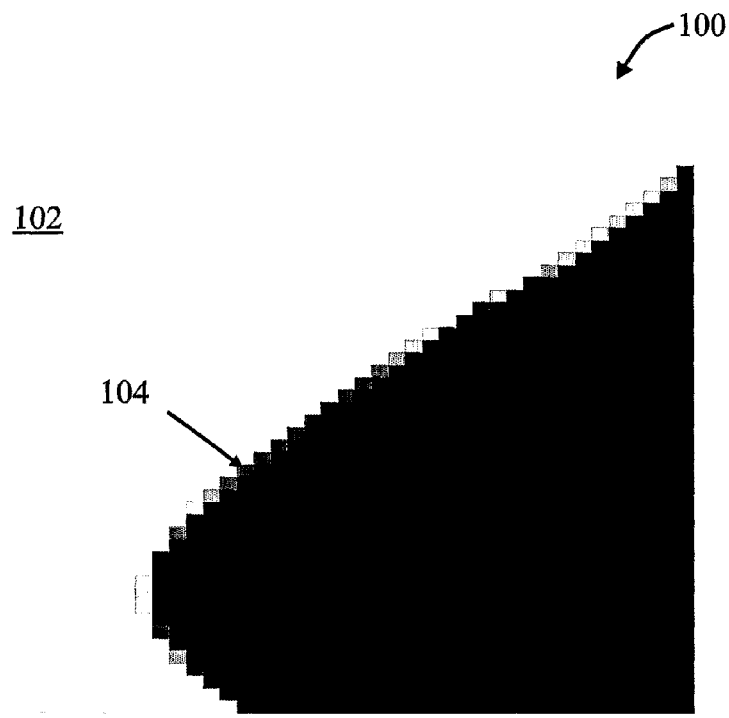
FIG. 1A schematically shows a two-dimensional image without noise, and FIG. 1B schematically shows the same image with noise added, and with a selected pixel and neighborhood, according to the prior art.

The present invention, in some embodiments thereof, relates to a method of reducing noise in images and, more particularly, but not exclusively, to a method of reducing noise in medical images using nonlinear filters.

An aspect of some embodiments of the invention concerns a method of reducing noise in an image, in which neighborhoods of different pixels are compared, in order to find pixels with similar neighborhoods. One or more features are used to determine such similarity, including at least one feature that involves evaluating characteristics of a distribution function of raw or transformed grey levels in the neighborhoods, other than mean grey level. Optionally, the characteristic of the distribution function is a moment of the distribution function higher than the first moment, which is the mean grey value, for example the second moment, which is the standard deviation, the third moment, which is a degree of skew, or a higher moment of the distribution. Optionally, the distribution function is a distribution function of the raw grey values of the image. Alternatively, the distribution function is a distribution function of the grey levels of the transformed image, for example filtered by a Gaussian filter. Optionally, characteristics of the distribution function are found both for all the pixels in the neighborhood, and for only the pixels that are located in a second neighborhood that is a portion of the neighborhood.

An aspect of some embodiments of the invention concerns a method of reducing noise in an image, in which neighborhoods of different pixels are compared, using at least one feature that involves applying a transform to the image, or evaluating the effect of a filter on the image, that preferentially selects structures of a range of scales intermediate between the size of the neighborhood and a few pixels, or of some orientations over other orientations. Optionally, the filter is a linear filter, such as a wavelet filter. Optionally, the filter is directional. Optionally, the transform is a nonlinear morphological transform, such as a multiscale transform, or a morphological operator. In some embodiments of the invention, evaluating the feature involves evaluating the response of a directional filter in more than one direction. Optionally, the feature has a degree of symmetry in its dependence on angle, so that the value of the feature is substantially unchanged if the neighborhood is rotated by at least one angle, for example 180 degrees or 90 degrees, regardless of what the image looks like.

An aspect of some embodiments of the invention concerns a method of reducing noise in an image, in which neighborhoods of different pixels are compared, using at least one feature value that is calculated for one of the pixels using a neighborhood that is rotated or scaled with respect to the neighborhood of the other pixel.

In some embodiments of the invention, neighborhoods are defined for groups of pixels, rather than for individual pixels, and the noise reduction acts on groups of pixels, rather than on individual pixels. Alternatively, neighborhoods may be defined, and the noise reduction may act, on virtual pixels located between pixels, whose grey value is defined by interpolation of the pixels near them.

An aspect of some embodiments of the invention concerns a noise reduction in which, after the noise of the image is reduced, the residual image (the difference between the image before and after noise reduction) is examined, to see if it has structural elements, and if so, they are restored to the image.

In some embodiments of the invention, the noise level is estimated for different pixels, and, when the true grey value of a pixel without noise is estimated by using the grey values of similar pixels, the noisier pixels are given less influence on the estimated grey value.

An aspect of some embodiments of the invention concerns a noise reduction system in which the noise component of a pixel is estimated by first examining a set of test images, and classifying patches of pixels found on those images into clusters in an abstract vector space of the patches, considering the patches as vectors whose components are the grey values of their pixels. For each cluster, a reduced set of independent parameters (fewer than the number of pixels in the patch), for example a reduced set of linear coefficients of basis vectors, is found which provides a good approximation to most of the patches in that cluster, for the test images. When a noisy image is processed for noise reduction, a patch around each pixel is classified as belonging to one of the clusters, and its true value, without noise, is estimated using the reduced set of parameters for that cluster.

An aspect of some embodiments of the invention concerns choosing modified parameters for acquiring images, for example lower x-ray dose for CT images, or lower static magnetic field or acquisition time for MRI, and taking advantage of the noise reduction method to end up with an image of adequate quality to meet diagnostic needs, as if a higher x-ray dose or a higher magnetic field were used without noise reduction, for example.

The methods described herein may be applied, for example, on an image acquisition device or its workstation (e.g., CT, MRI machine), on an image processing station and/or via network connection to a remote location/server.

For purposes of better understanding some embodiments of the present invention, as illustrated in FIGS. 2B through 9 of the drawings, reference is first made to the operation of a conventional (i.e., prior art) method of noise reduction in images, as illustrated in FIGS. 1A through 2A.

FIG. 1A shows a two-dimensional image 100 comprising an array of pixels, each with a numeric value which is mapped to a grey value between black and white. The grey value in a CT image represents a convenient mapping of the actual density of the imaged object, customarily in Hounsfield units (HU). In CT images of the brain, for example, the image is usually visualized such that 0 HU, which represents the density of water, is mapped to black and 70 HU to white.

In general in the image processing literature, the term "pixel" is used for an element of a two-dimensional image, and "voxel" is used for an element of a three-dimensional image. Since methods described herein can generally be used for either two-dimensional or three-dimensional images, use of the terms "pixel" and "voxel" herein should not be understood to imply that the description is limited to the cases of two-dimensional or three-dimensional images. Rather, unless otherwise specified, the terms "pixel" and "voxel" as used herein may generally be understood to be generic terms that apply to either case, and they are often used interchangeably.

The term "grey value" as used herein can refer not only to the brightness level of a black and white image, but also to the level of any color variable in a color image, for example the red, green or blue intensity in a color image, or the brightness or saturation level of a colored image. In medical images such as CT or MRI images, there is usually only a single density variable, such as $T_1$ or $T_2$ weighted density, which is mapped to a brightness level of a grayscale image, and in this case "grey value" is particularly apt, but the methods described herein are not limited in their applicability to medical images or to black and white images. The noise reduction methods described herein may be especially useful for medical images, since medical images tend to have relative high noise levels because there is often a tradeoff between noise level and image acquisition parameters, such as x-ray dose or MRI acquisition time, that impose an economic or safety penalty for lowering noise. Also, since medical images generally do not have differences in "lighting," features of the neighborhood of a pixel are often a good indication of its true grey value. This is especially true because medical images tend to have similar structures repeated in different parts of the image, sometimes with changed scales or orientations.

Figure 1B:
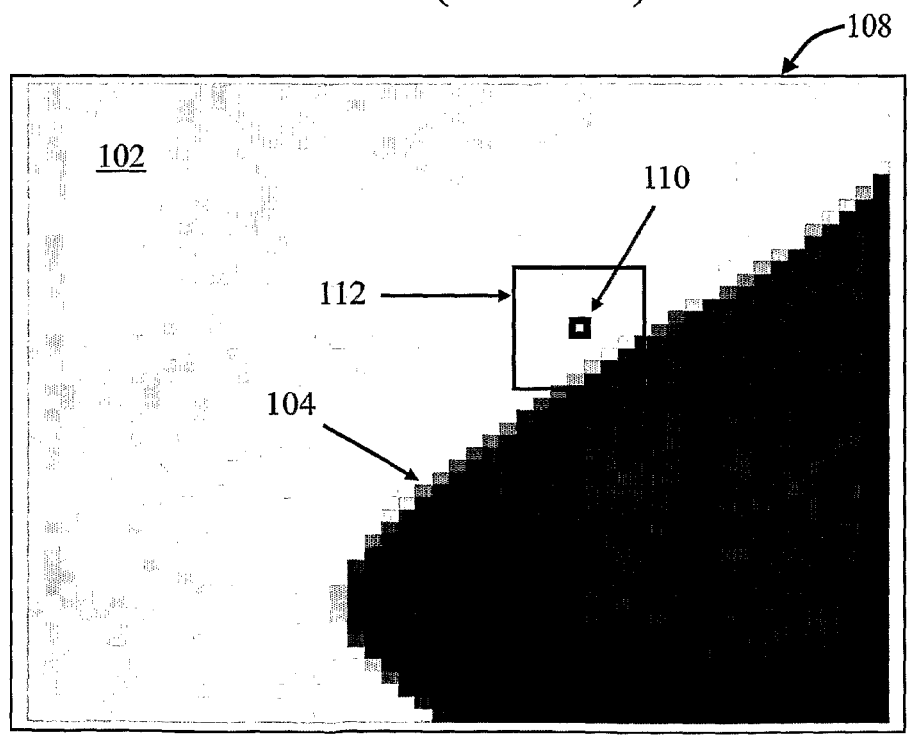

Image 100 includes a light region 102, and a dark region 104, with a fairly sharp boundary between them. In FIG. 1B, image 108 is image 100 with noise added to it. In the prior art, noise is sometimes reduced by averaging the grey values of pixels with the grey values of neighboring pixels, giving the most weight to pixels that are located closest. This works well in uniform areas without fine details, such as regions 102 and 104 in image 108, but would result in a blurring of the boundary between them. Another prior art noise reduction method, the bilateral filter, which is a nonlinear filter, tries to avoid this problem by averaging the grey value $I_i$ of a pixel i with the grey values $I_j$ primarily of other pixels j that resemble it in grey value. For example, when operating on a certain pixel i located at $(x_i, y_i)$, the weight $W_j$ given for the grey value of another voxel j, located at $(x_j, y_j)$, is given by:

$$W_j = \exp\left(-\frac{(x_i - x_j)^2}{\sigma_D} - \frac{(y_i - y_j)^2}{\sigma_D} - \frac{(I_i - I_j)^2}{\sigma_R}\right)$$
$$= \exp\left(-\frac{d_P^2}{\sigma_P} - \frac{(I_i - I_j)^2}{\sigma_R}\right)$$

Here $d_p$ is the Euclidean distance between the two pixels in space, and $|I_i - I_j|$ may be considered an abstract "distance" between the two pixels, a measure of how much they resemble each other. The new grey value for pixel i is defined to be $$\tilde{I}_i = \frac{\sum_{j \in N} W_j \cdot I_j}{\sum_{j \in N} W_j}$$

where N is the search window around pixel i, and the summation is for all pixels j in that search window.

Another type of nonlinear filter used for noise reduction is described by L. Rudin, S. Osher, and E. Fatemi, "Nonlinear total variation based noise removal algorithms," Physica D60, 259-268 (1992).

In the non-local means filter, a further development of the prior art, the resemblance of two pixels depends on pixel-by-pixel comparison of neighborhoods of the two pixels. For example, to reduce the noise level of pixel i, labeled 110 in FIG. 1B, a neighborhood $M_i$, labeled 112 in FIG. 1B, is defined around pixel 110. Other pixels j are then searched, with a neighborhood $M_j$ of the same size and shape around each such search pixel j, and a mean square error MSE($M_i$, $M_j$) is found between the pixels of neighborhood 112, and the corresponding pixels of the neighborhood of each search pixel j. Search pixels for which the mean square error is small between their neighborhoods and the neighborhood of pixel 110 are given the most weight, when averaging the grey values of the search pixels to obtain a reduced noise grey level for pixel 110. The weight $W_j$ is given by $$W_j = \exp\left(-\frac{d_P^2}{\sigma_P} - \frac{MSE(M_i, M_j)^2}{\sigma_R}\right)$$

The new value for pixel i is then determined as before:

$$\tilde{I}_i = \frac{\sum_{j \in N} W_j \cdot I_j}{\sum_{j \in N} W_j}.$$

Figure 2A:
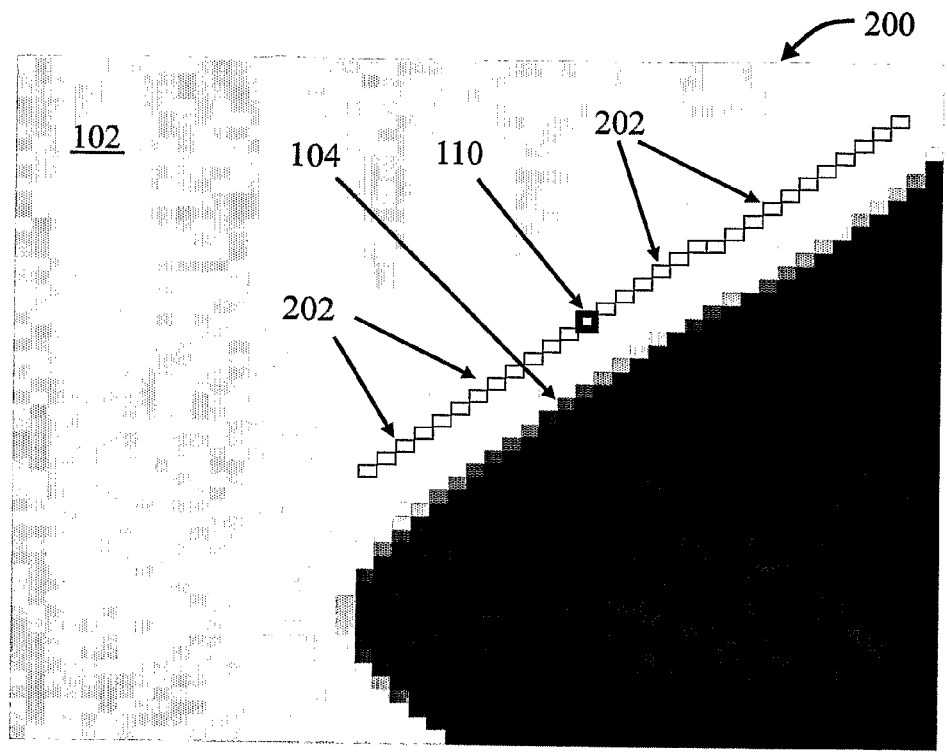
FIG. 2A schematically shows the image and selected pixel and neighborhood of FIG. 1B, together with other pixels that are similar to the selected pixel according to the prior art.

FIG. 2A shows an image 200, like image 108 in FIG. 1B, with a set of pixels 202 that have neighborhoods that resemble neighborhood 112 or pixel 110. Each of pixels 202 has a similar neighborhood because pixels 202 are all about the same distance from an edge between light region 102 and dark region 104 oriented in nearly the same direction.

In other prior noise reduction methods that use nonlinear filters, the resemblance of two neighborhoods is based on the mean grey value of all pixels in the neighborhood, or on the direction of the gradient of the grey value of the pixels in the neighborhood, as described by Mahmoudi, M. and Sapiro, G., "Fast image and video denoising via nonlocal means of similar neighborhoods," *IEEE, Signal Proc.*, Vol. 12, no. 12, pp. 839-842, December 2005. In a different method, described by A. Heidarzadeh and A. N. Avanaki, "An Enhanced Nonlocal Means Algorithm for Image Denoising," $9^{th}$ ISSPA, February 2007, the resemblance of the two neighborhoods depends on the mean square error of binary edge maps of the two neighborhoods, as determined using a Canny edge detector, as well as on the mean square error of the original image in the two neighborhoods.

Before explaining at least one embodiment of the invention in detail, it is to be understood that the invention is not necessarily limited in its application to the details set forth in the following description. The invention is capable of other embodiments or of being practiced or carried out in various ways.

Figure 2B:
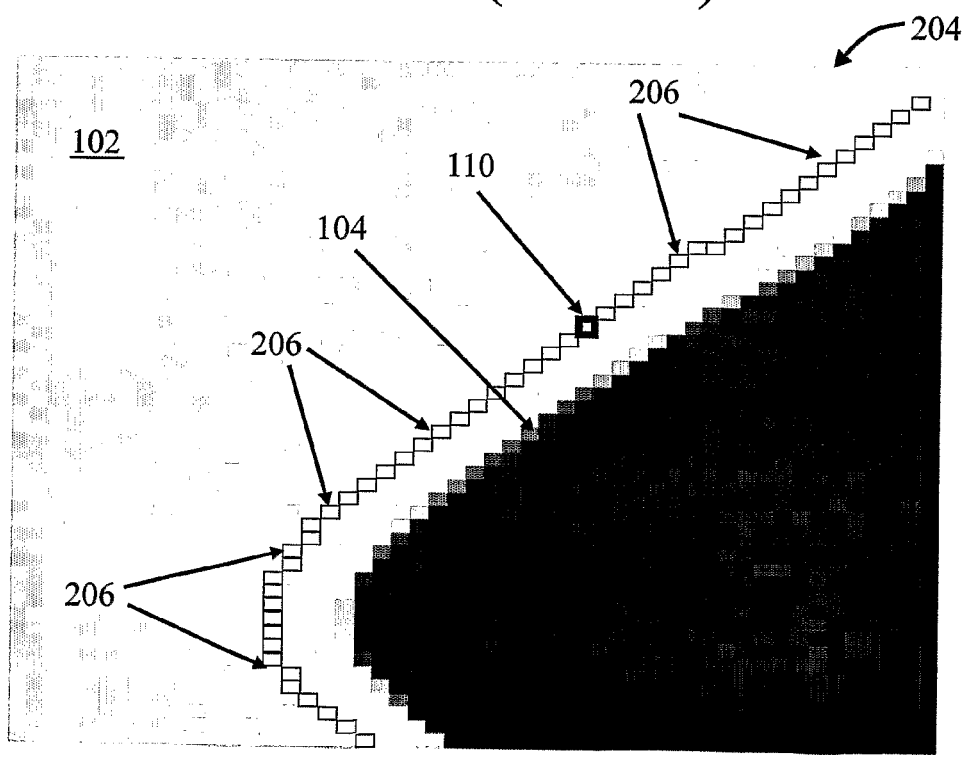
FIG. 2B schematically shows the image and selected pixel and neighborhood of FIG. 1B, together with other pixels that are similar to the selected pixel according to an exemplary embodiment of the invention.

FIG. 2B shows an image 204, like image 108. Calculating the weights $W_j$ using different criteria for the resemblance between two neighborhoods, according to an exemplary embodiment of the invention, a better set of search pixels 206 is found, which have neighborhoods that resemble neighborhood 112 of pixel 110 sufficiently closely. In the particular example shown in FIG. 2B, the criteria, which will be explained in detail below, do not depend on the relative orientation of the neighborhoods, so all pixels that are about the same distance from dark region 104 as pixel 110 will have neighborhoods that closely resemble neighborhood 112, according to these criteria. This enlarged set of search pixels 206 with high weights, compared to search pixels 202 with high weights using the non-local means method, may allow a further reduction in noise, because there are more pixels to average grey value over. In some embodiments of the invention, the criteria for resemblance between two neighborhoods may depend on relative orientation of the two neighborhoods, and in these or other embodiments of the invention, the number of search pixels with high weights may not be greater than in prior art methods, but the quality of the search pixels may be better, in the sense that they provide a better estimate of the true grey value of pixel 110.

Figure 3:
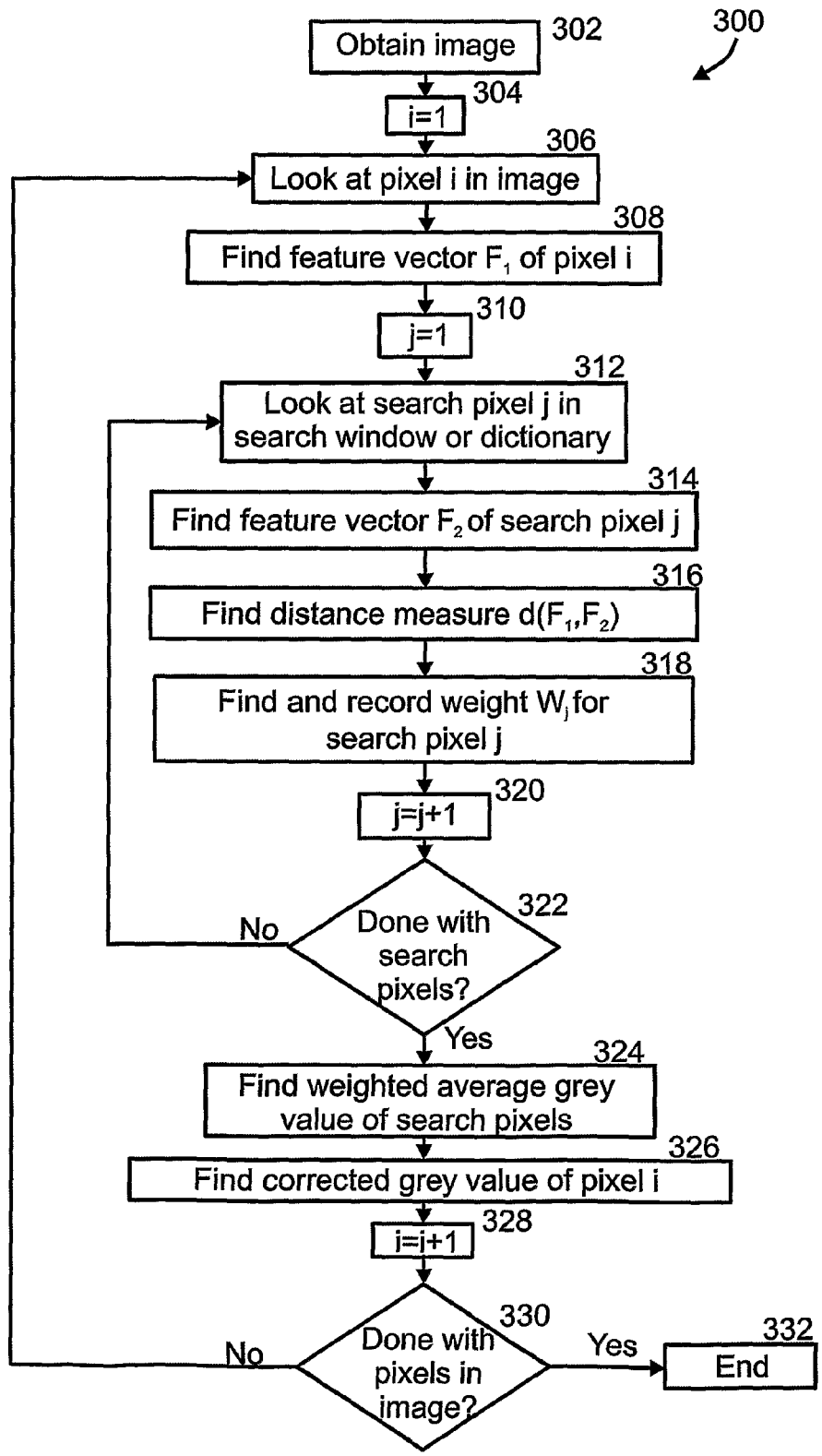
FIG. 3 is a flowchart for a method of reducing noise in an image, according to an exemplary embodiment of the invention.

FIG. 3 shows a flowchart 300 for a method of reducing noise in an image, according to an exemplary embodiment of the invention. The method of flowchart 300 is a generalization of the method of FIG. 2B, with different criteria for resemblance between neighborhoods. At 302, an image with noise is obtained. The noise reduction algorithm examines one pixel at a time, and initially sets a pixel index i equal to 1, at 304. At 306, the i-th pixel is considered, and a feature vector $F_1$ is found at 308. A feature vector is an ordered set of values of one or more features, each depending on the grey value of the pixel being considered, and/or the grey values of other pixels in a surrounding neighborhood. The neighborhood need not be contiguous. The coordinates of the pixel being considered, for example $x_i$ and $y_i$, or $x_i$, $y_i$ and $z_i$ in the case of a three-dimensional image, may also be treated as features. Examples of features known in the prior art include the grey value of pixel i, used in the bilateral filter described above, and the grey values of each of the pixels in a neighborhood of specified size around pixel i, used in the non-local means filter. Other features known in the prior art, as described above, include the mean grey value of all the pixels in a neighborhood of pixel i, the direction of the gradient of grey values in a neighborhood of pixel i, and the grey value of each pixel in a binary edge map of a neighborhood of pixel i, as determined using a Canny edge detector. As will be described in more detail below, there are a wide variety of other features that may be defined, according to exemplary embodiments of the invention.

Starting at 310, a set of search pixels is examined, labeled by search pixel index j, in order to find pixels that resemble pixel i in having similar feature values. The grey values of the search pixels j which most resemble pixel i will contribute the most to an estimate of true grey value, without noise, of pixel i. Initially, at 310, index j is set equal to 1. At 312, the j-th search pixel is considered. The search pixels optionally comprise all pixels in the image, or all pixels except pixel i. Alternatively, the search pixels comprise only a subset of pixels in the image, for example only pixels within a search window around pixel i, or only some pixels selected randomly or at regular intervals within the search window, and/or only pixels with a grey value sufficiently close to that of pixel i. Optionally, for example in a medical image, the image is segmented into different types of tissue using any known segmentation technique, and search pixels are chosen only, or preferentially, from pixels of the same type of tissue as pixel i.

Additionally or alternatively, search pixels may be chosen from a dictionary of pixels from other images that are expected to be similar to this image. For example, if the image is a medical image, the dictionary comprises pixels from earlier images made of the same part of the body of the same patient, or pixels from the same part of the body of other patients.

At 314, a feature vector $F_2$ is evaluated for search pixel j. Feature vector $F_2$ is an ordered set of one or more values of features, each corresponding to one of the feature values in feature vector $F_1$. Optionally, corresponding features in $F_1$ and $F_2$ are defined in the same way, using the grey values of corresponding pixels in neighborhoods of pixel i and pixel j. In some embodiments of the invention, the values of corresponding features in $F_1$ and $F_2$ are defined differently, for example the neighborhood around one of the pixels may be oriented at a different angle, or scaled in size, relative to the neighborhood around the other pixel, with the grey values interpolated if necessary, in calculating the feature value. In any case, corresponding feature values in $F_1$ and $F_2$ are optionally defined in a similar enough way that it is meaningful to compare them, and to use the differences in their values to calculate an abstract distance measure between pixel i and pixel j, that measures how much they resemble each other for purposes of noise reduction.

If search pixel j is taken from a previously stored dictionary of search pixels, rather than from the image being examined, then optionally feature vector $F_2$ for pixel j, or some of its components, is also stored in the dictionary, and does not have to be calculated each time it is used. Similarly, if search pixel j was previously used as a search pixel for another pixel i, then its feature vector $F_2$ is optionally stored in memory, and does not have to be calculated again. Optionally, feature vector $F_2$ is evaluated in advance, optionally for all pixels in the image, and is stored in memory, so $F_2$ does not have to be evaluated during loops over search pixel j and pixel i. To the extent that feature values of $F_2$ are defined in the same way as corresponding feature values of $F_1$, feature vector $F_2$, or some of its components, may also be retrieved from memory, rather than calculated again, if search pixel j was previously used as the pixel i being examined at 306.

At 316, a distance measure $d(F_1, F_2)$ is optionally calculated, which is an abstract distance reflecting the resemblance of pixel j to pixel i, as defined by their grey values and the grey values of their neighborhoods, and possibly by their locations as well. Distance measure d depends on the differences in value of each of the corresponding features making up feature vectors $F_1$ and $F_2$. If feature vectors $F_1$ and $F_2$ each have k components (feature values) given by $F_1=(f_1^1, f_2^1, \ldots, f_k^1)$ and $F_2=(f_1^2, f_2^2, \ldots, f_k^2)$, then the distance measure may be defined by $$d(F_1,F_1)^{1/\beta}=(\alpha_1|f_1^1-f_1^2|^\beta+\alpha_2|f_2^1-f_2^2|^\beta+\ldots+\alpha_k|f_k^1-f_k^2|^\beta)$$

Here $(\alpha_1, \alpha_2, \ldots \alpha_k)$ is a weight vector giving weights used for the different features in calculating the distance measure. The parameter $\beta$ is typically a positive number of order unity, and is often set equal to 2, which makes $d(F_1, F_2)$ a Euclidean distance of orthogonal components which are each equal to a weighted absolute difference between feature values for the two pixels i and j. As will be described below, the weight vector $(\alpha_1, \alpha_2, \ldots \alpha_k)$ is optionally found using a genetic algorithm, which attempts to find an optimal weight vector that maximizes the effectiveness of the noise reduction method.

An alternative expression for d($F_1$, $F_2$), which takes into account correlations between different feature values, for example between the grey values of different pixels in a neighborhood, is discussed below in the description of FIG. 8. That expression for d($F_1$, $F_2$) may include cross-terms such as $(f_1^1-f_1^2)(f_2^1-f_2^2)$, and may provide a more useful measure for the degree of resemblance between different neighborhoods, in a case where different feature values are correlated.

At 318, a weight $W_j$ for pixel j is optionally calculated from d($F_1$, $F_2$), and saved in memory. Weight $W_j$ is greatest when the neighborhoods of pixels i and j most resemble each other, i.e. when d is small, and $W_j$ is small when d is large. For example, $W_j = \exp(-d^2/\sigma_N)$. If the feature values depend only on the grey values of the pixel and its neighbors, and not on the position of the pixel, then optionally $W_j$ is defined by $W_j = \exp(-d^2/\sigma_N - d_p^2/\sigma_p)$, where $d_p$ is a measure of physical distance between pixels i and j, for example the Euclidean distance. Here $\sigma_N$ and $\sigma_p$ are parameters which determine how quickly $W_j$ falls off with increasing abstract distance d, and spatial distance $d_p$, between pixels i and j. Alternatively, $W_j$ has a different dependence on d and $d_p$, but still falls off at greater values of d and $d_p$. Optionally, to save computation time, or to enhance performance, the weight is set equal to zero when it is smaller than some threshold, or when d and/or $d_p$ is larger than some threshold.

At 320, search pixel index j is increased by 1, to look at the next search pixel. At 322, it is determined whether all the search pixels have been examined. If not, the next search pixel is considered at 312. When all the search pixels have been examined, a weighted average of the grey values of the search pixels j, weighted by $W_j$, is calculated.

At 326, a true grey value for pixel i without noise is estimated, based on the grey values of the search pixels, and optionally on the original grey value of pixel i as well, with search pixels having a greater influence on the estimated true grey value if they are deemed to be more similar to pixel i, based on having similar feature values. For example, the similarity in the feature values is used to calculate an abstract distance measure d($F_1$, $F_2$), as described above, each search pixel j is assigned a weight $W_j$ based on its distance measure from pixel I, and the estimated true grey value of pixel i is found from a weighted average of the grey values of the search pixels j, with weights $W_j$. The average can be a mean, a median, a mode, a mean with outliers removed, or any other type of average.

Alternatively, an estimate of a true grey value of pixel i is calculated in a different way from the grey values of the search pixels, and the feature vector $F_2$ of the search pixels and feature vector $F_1$ of pixel i. For example, search pixels are divided into classes, optionally representing different tissue types, based on clustering of their feature vectors $F_2$, and only search pixels in the same class as pixel i are used to estimate the true grey value of pixel i, or have a greater effect on the estimated true grey value of pixel i. Alternatively, only the top few search pixels j that have feature vector $F_2$ closest to $F_1$ by some measure, are used to estimate the true grey value of pixel i. Optionally, instead of using an average of grey values of search pixels that contribute, the estimated true grey value of pixel i is found from a look-up table based on the grey values of a few search pixels.

The corrected grey value is optionally a linear combination of the original grey value of pixel i, and the weighted average of the search pixels. Optionally the original grey value of pixel i is not taken into account explicitly, but optionally pixel i itself is treated like another search pixel and is included in the weighted average. In this case, the weight $W_j$ for pixel i itself would be 1 if the feature values of $F_2$ are defined in the same way as the corresponding feature values of $F_1$, but might be less than 1 if the feature values of $F_2$ are defined differently, for example with the neighborhood rotated or scaled.

It should be understood that the grey values of the pixels referred to herein are not necessarily the original grey values of the image, but could be grey values of a transformed or filtered image, for example a Gaussian filtered image with a equal to only a few pixel widths or less.

At 328, pixel index i is increased by 1, and at 330, it is determined if there are any pixels remaining to consider. If there are, the next pixel i is considered at 306. If not, the procedure ends at 332, with the reduced noise image, using the corrected grey values found at 326, as output.

Figure 4A:
FIG. 4A is a noisy CT image made using a relatively low x-ray dose.
Figure 4B:
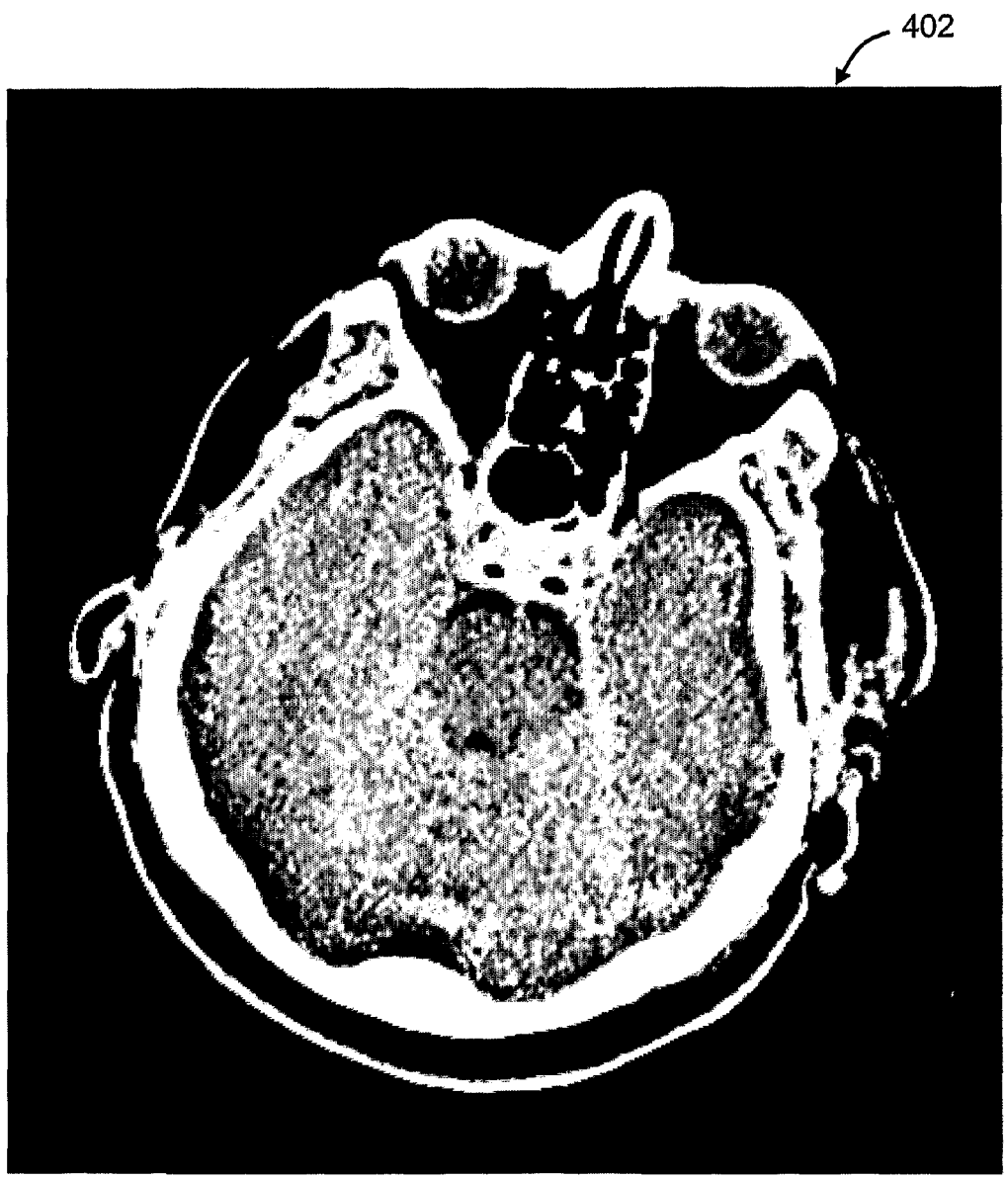
FIG. 4B shows the image of FIG. 4A, with noise reduced using the method of FIG. 3.
Figure 4C:
FIG. 4C is a low noise CT image similar to the image in FIG. 4A, but made using a relatively high x-ray dose.

FIG. 4A shows a noisy image 400, a CT image of a slice of the head, to illustrate the method outlined in FIG. 3. The image is noisier than normal, because it was obtained using a reduced x-ray dose. FIG. 4B shows a reduced noise image 402, obtained from image 400 using the method of FIG. 3 with a set of features and a weight vector that will be described below. For comparison, FIG. 4C shows a low noise image 404, obtained using a normal x-ray dose for this kind of image. Noise reduced image 402 has considerable less noise than original image 400, and more detail can be seen, particularly in the brain where there is relatively low contrast between different tissues. Image 402 appears to be closer in quality to low noise image 404, than to image 400.

Exemplary Types of Features

Several types of features may be used in the feature vectors $F_1$ and $F_2$.

In some exemplary embodiments of the invention, calculating one or more of the feature values comprises finding characteristics of a distribution of grey values of pixels in a neighborhood. Optionally, the feature value is a moment of the distribution of grey values, or a function of one or more moments, where the first moment of a distribution is the mean, the second moment in the standard deviation, the third moment is the skew, and so on. The k-th moment of the distribution, for k>1, may be defined as $$M_k = \left(\frac{1}{N}\sum_n (I_n - M_1)^k\right)^{1/k}$$

where $I_n$ is grey value of the n-th pixel in the neighborhood, the sum is over the N pixels in the neighborhood, and $M_1$ is the first moment, i.e. the mean of the grey values. Alternatively or additionally, the feature value is, or depends on, an order statistic of the distribution, the grey value corresponding to a given percentile of the distribution. For example, the feature value is the median grey value, which is the grey value at the 50% percentile. Alternatively, the grey value of a different percentile is used, for example the 25%, 37.5%, 62.5% or 75% percentiles. Optionally, an intermediate percentile is used, for example between 25% and 75%, which has the potential advantage that the feature value will be a characteristic of the neighborhood as a whole, and not just of a few outlier pixels in the neighborhood. Optionally, if search pixels are chosen from a dictionary which includes search pixels of other images, with grey values normalized differently, then the grey values of the two images are normalized so they may be meaningfully compared, for example in features based on order statistics.

A feature that depends only on characteristics of the distribution of grey values of pixels in a neighborhood, particularly if the neighborhood is a square or another shape that is fairly isotropic, has the potential advantage that the feature value may be relatively insensitive to the orientation of structures in the image. Using such a feature for image 204 in FIG. 2B, for example, is likely to produce a set of pixels like pixels 206 which have feature value close to that of pixel 110, because the feature value will depend mostly on the distance of the pixel from dark region 104, and not on the local orientation of the boundary between the dark and light regions. On the other hand, if it is known that a certain part of the image has edges or texture oriented in a particular direction, for example from a segmentation map of body tissues, then it may be advantageous to use features that are sensitive to orientation of structures.

Optionally, the feature value is not found from a distribution of the raw grey values of the pixels in the neighborhood, but from a distribution of the grey values after the image has been smoothed or otherwise processed in some way. Smoothing the image before evaluating such feature values has the potential advantage that the feature value may depend more on structural characteristics of the image in the neighborhood, and be less sensitive to noise in the neighborhood. Optionally, such smoothing or image processing is done before evaluating the feature value for any of the types of features described herein, not just for features that depend on a distribution of grey values. The smoothing may be done, for example, by a Gaussian filter, a bilateral filter, or a total variation filter as described by Rudin et al, cited above. Optionally, the smoothing is done in a way that does not smooth out most of the structure on a scale of the largest dimension of the neighborhood that is being used for the feature, or even on a scale of the smallest dimension of the neighborhood. For example, if a Gaussian filter is used with width parameter $\sigma$, then $\sigma$ is optionally smaller, or at least not much larger, than the largest dimension of the neighborhood, or the smallest dimension of the neighborhood. Alternatively, the smoothing is done in a way which effectively smoothes out all the spatial structure of the neighborhood, and the feature value is a measure of structure not within the neighborhood, but of structure on a larger scale around the neighborhood, or of an average gradient around the neighborhood.

Optionally, the image is processed in a different way before finding the distribution of grey values. For example, a derivative operator is applied to the image, replacing the grey value of each pixel by a value proportional to the derivative of the image in a particular direction, or by a value proportional to the magnitude of the gradient of the image. If this is done, then, for example, the mean of the distribution of values of the pixels in the neighborhood will be a measure of the average gradient in the neighborhood. Optionally, the image is smoothed before finding the gradient, optionally sufficiently smoothed so that most of the pixels in the neighborhood have nearly the same gradient, making this feature value less sensitive to noise.

In some exemplary embodiments of the invention, calculating the feature value comprises applying to the image, at least within a neighborhood, a transform or filter that preferentially selects structures of a range of scales intermediate in size between the largest dimension of the neighborhood, and a few pixels. Alternatively or additionally, the transform or filter preferentially selects structures oriented in some directions over other directions. Features defined in this way may be useful for picking out structures in the image that are expected to have dimensions and/or orientations within a certain range, for example blood vessels, while ignoring finer scale variations in density that are due to noise.

These embodiments of the invention may use features that employ any of a large variety of filters and transforms, linear and nonlinear, which have been used for applications such as computer handwriting recognition, or automatically classifying objects in images so they can be searched without relying on text description, but they have not been used for noise reduction.

Such features may depend on the response of the image in the neighborhood to wavelet filters, such as Meyer or Gabor filters, Laplacian and Gaussian pyramids, or any other linear filters known in the art. Such filters may be most sensitive to structures in the neighborhood that have particular orientations, and/or particular scales. Optionally, the filter is applied only to the neighborhood. Alternatively, the filter is applied to a region larger than the neighborhood, or even the whole image, and the feature depends on the response of the filter in the neighborhood, for example on the grey value of one or more pixels in the neighborhood, after the image has been filtered. These options and alternatives apply also to any of the other types of features described herein that involve applying a filter or a transform to image pixels.

Additionally or alternatively, the feature value depends on a difference in the response of the image to Gaussian filters, or other smoothing filters, at two different size parameters $\sigma_1$ and $\sigma_2$. The difference between two such filters tends to select structures intermediate in scale between $\sigma_1$ and $\sigma_2$, but without any dependence on orientation of the structures, if the filters are isotropic. A feature defined in this way may be particularly useful if the image has similar structures oriented in many different directions.

In some embodiments of the invention, the feature may depend on the response of the image in the neighborhood to a nonlinear transform, such as a morphological multi-scale transform or a morphological operator. For example, the feature value depends on the grey value of the pixel being examined, or a particular pixel in the neighborhood, after applying a nonlinear multiscale transform to the image using a particular scale parameter. Optionally, the feature value depends on the grey value of the pixel using two or more different scale parameters, for example the difference in grey value of the pixel for two different scale parameters. Examples of morphological multiscale transforms include morphological wavelets and morphological pyramids, described for example by E. H. Adelson, C. H. Anderson, J. R. Bergen, P. J. Burt, and J. M. Ogden, "Pyramid Methods in Image Processing," *RCA Engineer* 29, no. 6, November-December 1984, pp. 33-41, or in "Nonlinear Multiresolution Signal Decomposition Schemes—Part I: Morphological Pyramids," John Goutsias, and Henk J. A. M. Heijmans. IEEE TRANSACTIONS ON IMAGE PROCESSING, VOL. 9, NO. 11, NOVEMBER 2000.

The feature may also depend on the grey value of a pixel after applying a morphological operator. Morphological operators are applied to an image to enhance or extract certain structures. An example of a morphological operator is the top hat transform, the difference between an input image and its morphological opening by a structuring element. Such an operation will reveal bright details on a dark background, with the size of the structuring element controlling the size of the detected features. A similar operator can be defined which extracts dark structures over a white background.

The literature on shape-matching and image morphing includes a wide variety of techniques that can be used to characterize shapes in an image, and any of these methods may be used to define features of a neighborhood, before or after applying morphological transforms or operators as discussed above. Examples include the Earth Mover's Distance introduced by Yossi Rubner, Carlo Tomasi, and Leonidas J. Guibas, "A Metric for Distributions with Applications to Image Databases," *Proceedings of the* 1998 *International Conference on Computer Vision*, Bombay, India; the Kantorovich-Wasserstein metric used for image morphing, described for example by Steven Haker, Lei Zhu, Allen Tannenbaum and Sigurd Angenent, "Optimal Mass Transport for Registration and Warping," *International Journal of Computer Vision* 60(3), 225-240 (2004); the shape signatures defined by Robert Osada, Thomas Funkhouser, Bernard Chazelle and David Dobkin, "Matching 3D Models with Shape Distributions," *ACM Transactions on Graphics* 21, 807-832 (2002); and the metrics for shape matching defined by Serge Belongie, Jitendra Malik, and Jan Puzicha, "Shape Matching and Object Recognition Using Shape Contexts," *IEEE Transactions on Pattern Analysis and Machine Intelligence* 24, 509-522 (2002); all referenced above.

In some exemplary embodiments of the invention, corresponding feature values for a pixel i that is being examined, and a search pixel j, are calculated with the neighborhoods changed by a geometric transformation in going from one to the other. For example, the two neighborhoods are at different relative orientations, scales, or both. Additionally or alternatively, one of the neighborhoods may be mirror reflected relative to the other. For example, if the algorithm for finding the feature value for pixel i involves using the grey value of a pixel in the neighborhood that is a certain distance away in the +x direction from pixel i, then the feature value for pixel j is calculated using instead a pixel that is the same distance away in the +y direction (a 90 degree rotation) from pixel j, or the same distance away in the −x direction (a reflection), or twice as far away in the +x direction (a scale change), or twice as far away in the +y direction (a rotation plus a scale change), etc. Optionally, the grey values of the rotated and/or scaled neighborhood are interpolated before calculating the feature value, particularly if the rotation angle is not an integer multiple of 90 degrees (in the case of a Cartesian grid of pixels) or the scale factor is not an integer. Optionally, the pixels are arranged in a triangular or hexagonal grid, or a more complicated pattern.

Using a feature defined in this way may be particularly useful if the same feature is defined without rotation and/or scaling and/or reflection, and for a variety of different rotation angles and/or scaling factors, and the resulting features are all given the same weight. This may result in a distance measure that is independent of the orientation and/or scale of structures in the image, at least over some range of orientations and/or scales. This may be advantageous if the image includes similar structures with different orientations or scales, or which are mirror images of each other.

Genetic Algorithm to Optimize Weight Vector for Features

Figure 5:
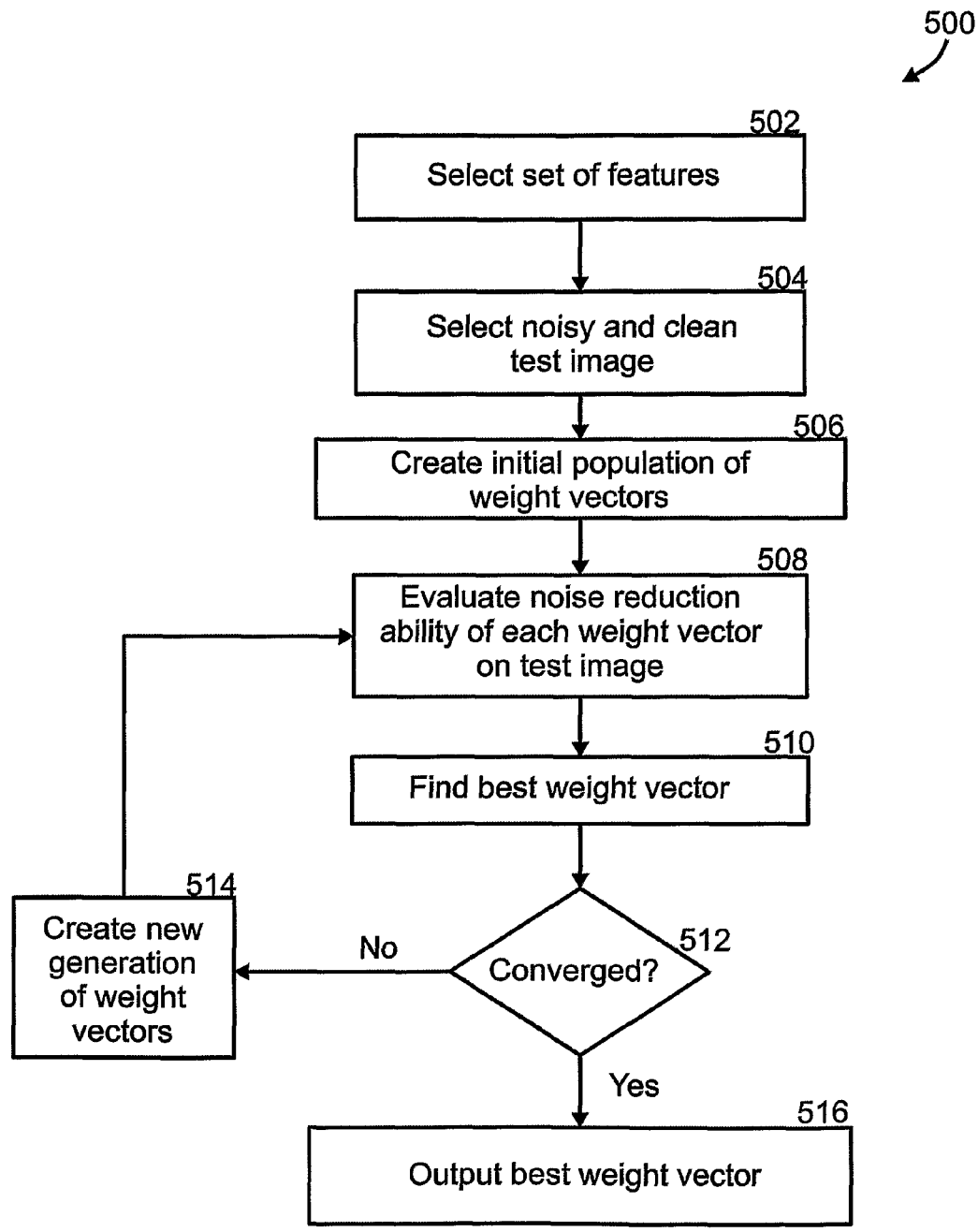
FIG. 5 is a flowchart for a method of using a genetic algorithm for finding a more effective set of feature weights to use in the method of FIG. 3, according to an exemplary embodiment of the invention.

With the wide variety of possible features described above, it may be difficult to systematically find an optimal set of such features, and corresponding weights α, which gives the best results for reducing noise, for a given imaging modality, a given part of the body or disease state, a given type and concentration of contrast material, or other image characteristics. This is especially true since different features can interact synergistically, in affecting how well a given set of features works. FIG. 5 shows a flowchart 500, illustrating a genetic algorithm method that can be used to find an optimal, or at least superior, weight vector for a set of features. Here, "superior" means more effective for noise reduction, in a given class of images.

It should be understood that any optimization method known in the art may be used to find a weight vector. Using a genetic algorithm may be advantageous because the set of possible features has a large variety of modular parts, the individual features, which interact synergistically, somewhat like genes in an organism.

At 502, a set of features is selected and ordered. Optionally, the set of features contains a very large number of features, with the expectation that the results of the genetic algorithm can be used to eliminate many of the features. To the extent that some of the weights are found to be very low, this may indicate that the corresponding features are not very useful for reducing noise, and they can be eliminated from the list, saving computation time when the noise reduction software is run.

At 504, a noisy test image is selected, together with an equivalent low noise test image, with much less or no noise. The effectiveness of a given ordered set of features and corresponding weight vector will be tested by applying the noise reduction algorithm to the noisy test image, and measuring how close the output image is to the low noise test image. The genetic algorithm may work best if the test images are obtained from the same imaging modality as the images that the noise reduction software is expected to work on. The nature of the images and of the noise is likely to affect the effectiveness of a given set of features and corresponding weight vector. Optionally, the noisy test image is obtained at the same time as the low noise test image, but with different acquisition parameters, for example with lower x-ray dose for a CT image, or shorter acquisition time for an MRI image. Alternatively, the noisy image is generated by adding simulated noise to the low noise image.

At 506, an initial population of weight vectors is created, using, for example, a random number generator. Each weight vector has one component for each of the features in the ordered set. The population is optionally large enough, and sufficiently spread out in the phase space of possible weight vectors, that it is unlikely that the genetic algorithm will get stuck at a local maximum in effectiveness that is much worse than the global maximum. On the other hand, the population is optionally not so large that the computation time for running the genetic algorithm is impractically long. To some extent, especially if a large number of features are being tested, it may be difficult to determine how large a population should be used, and it may be difficult to satisfy both the conditions above. To some extent, the computational difficulty of using a large variety of features can be avoided by limiting the number of features with non-zero weight in any one member of the population, on the assumption that the synergistic advantages of combining a variety of different features can be obtained without using more than a small fraction of all the features in the set. Verifying such an assumption, and getting an idea of what constitutes an adequate population size, may be done by making tests with different starting populations, and seeing if the end results differ very much.

At 508, the noise reduction effectiveness of each weight vector is evaluated, by running the noise reduction algorithm on the noisy test image, and comparing the result to the low noise test image. A measure of the effectiveness of the weight vector is, for example, a mean square error between the image resulting from the noise reduction algorithm, and the low noise test image. The negative or the inverse of the mean square error may be used, if it is desired to define the effectiveness measure so that a higher number means a more effective weight vector. Optionally, a visual or psychological measure of error is used to measure the effectiveness of the weight vector; see James L. Mannos and David J. Sakrison, "The effect of a visual fidelity criterion on the encoding of image," *IEEE Trans. on Information Theory* 20, no. 4, p. 525 (July 1974).

At 510, the most effective weight vector is optionally found, by finding the weight vector with effectiveness measure indicating the greatest effectiveness, of all the weight vectors in the population.

At 512, it is determined whether the genetic algorithm has converged, or whether it has found a weight vector that is effective enough. This is done, for example, by comparing the effectiveness measure of the most effective weight vector to that quantity in the previous generation, or in several of the previous generations, to see if it is still changing very much in each generation. Alternatively, the effectiveness measure of the most effective weight vector is compared to some absolute standard of effectiveness. If the genetic algorithm has not converged, then at 514 a new generation of weight vectors is created. The new generation is created, for example, by having the more effective weight vector produce a greater number of offspring than the less effective weight vectors, with the least effective weight vectors not producing offspring at all. Optionally, in addition, the weight vectors undergo some mutations, and the same components of different weight vectors may cross-over to some extent. This is optionally done using an efficient genetic algorithm, and other genetic algorithm methods may be used as well, according to the known art.

Each of the new population of weight vectors is evaluated at 508, and the procedure continues for succeeding generations, until the effectiveness measure starts to converge. Once a convergence criterion is satisfied, based for example on the relative change in the effective measure over the past few generations, the procedure ends at 516, and the most effective weight vector is produced as output.

Exemplary Feature Set and Weight Vector

Table 1 shows an ordered of set of features, and the corresponding components of the weight vector found using a genetic algorithm as described in FIG. 5. The list of features was not a comprehensive list covering the variety of possible features described herein, but includes only certain types of features, while tests using other types are features instead or in addition are ongoing, and may well lead to more effective noise reduction. It should be noted that the large range of order of magnitude of the weights listed in Table 1 reflect the relative magnitudes of the feature values, which are not normalized, as well as the relative effectiveness of the different features, so the features with the highest weights are not necessarily the most important ones to include. The images shown in FIGS. 4A, 4B, and 4C are cross-sections in the x-y plane of a full three-dimensional image that had its noise reduced using the set of features and the weight vector shown in Table 1. The voxels of the full 3D image are somewhat longer in the z-direction than they are in the x and y directions. The cross-sections shown in FIGS. 4A, 4B and 4C are about 450 by 500 pixels in the x and y directions.

In Table 1, "The image itself" means the grey value of the pixel, in Hounsfield units. The various order statistic features mean the grey level, in Hounsfield units, of the percentile specified, for the distribution of grey levels in the neighborhood specified, with the search pixel at the center of the neighborhood. "Mean square error" is the standard deviation of the distribution of grey levels in the neighborhood, in Hounsfield units. The Gaussian filter features involve the difference in the response of the grey level, in Hounsfield units, of the central pixel to two Gaussian filters with different σ (sigma) parameters, measured in millimeters. In the features involving gradients, the units of the gradient are Hounsfield unit per millimeter. Ix, Iy, and Iz refer respectively to the x, y, and z components of the gradient, while the gradient norm means the magnitude of the gradient.

TABLE 1

Features and Weight Vector

| Description of feature | Weight |
| --- | --- |
| 1. 'The image itself' | 158.9857 |
| 2. 'A 3 × 3 × 1 order statistic filter - the lower 25% mark' | 2.9901 |
| 3. 'A 3 × 3 × 1 order statistic filter - the lower 62.5% mark' | 0.9711 |
| 4. 'A 5 × 5 × 3 order statistic filter - the lower 75% mark' | 41.1578 |
| 5. 'A 5 × 5 × 3 order statistic filter - the lower 25% mark' | 3.7025 |
| 6. 'A 5 × 5 × 3 order statistic filter - the lower 37.5% mark' | 5.1968 |
| 7. 'A 5 × 5 × 3 order statistic filter - the lower 50% mark' | 0.0049 |
| 8. 'A 5 × 5 × 3 order statistic filter - the lower 62.5% mark' | 10074.1231 |
| 9. 'A 7 × 7 × 3 order statistic filter - the lower 50% mark' | 0.0009 |
| 10. 'A 7 × 7 × 3 order statistic filter - the lower 25% mark" | 652.1851 |
| 11. 'A 7 × 7 × 3 order statistic filter - the lower 75% mark' | 0.3207 |
| 12. 'The mean sq. error in a 3 × 3 × 1 neighborhood' | 0.2037 |
| 13. 'The mean sq. error in a 5 × 5 × 3 neighborhood' | 0.2872 |
| 14. 'The mean sq. error in a 7 × 7 × 3 neighborhood' | 0.0409 |
| 15. 'A difference of Gaussians filter with sigmas 1, 2' | 0.0004 |
| 16. 'A difference of Gaussians filter with sigmas 2, 3' | 0.0751 |
| 17. 'A difference of Gaussians filter with sigmas 3, 4' | 0.0001 |
| 18. 'A difference of Gaussians filter with sigmas 4, 5' | 0.5498 |
| 19. 'A difference of Gaussians filter on the gradient norm image, with sigmas 1, 2' | 13.5458 |
| 20. 'A difference of Gaussians filter on the gradient norm image, with sigmas 3, 4' | 0.4302 |
| 21. 'A difference of Gaussians filter on the gradient norm image, with sigmas 4, 5' | 0.0006 |
| 22. 'A difference of Gaussians filter on the gradient norm image, with sigmas 6, 7' | 0.0005 |
| 23. 'A difference of Gaussians filter on the Ix image, with sigmas 1, 2' | 0.5387 |
| 24. 'A difference of Gaussians filter on the Iy image, with sigmas 1, 2' | 3.2296 |
| 25. 'A difference of Gaussians filter on the Iy image, with sigmas 2, 3' | 0.0031 |
| 26. 'A difference of Gaussians filter on the Iz image, with sigmas 2, 3' | 0.1743 |
| 27. 'A difference of Gaussians filter on the Ix image, with sigmas 3, 4' | 0.0046 |
| 28. 'A difference of Gaussians filter on the Iy image, with sigmas 3, 4' | 6.5919 |
| 29. 'A difference of Gaussians filter on the Iz image, with sigmas 3, 4' | 0.0009 |
| 30. 'A difference of Gaussians filter on the Iy image, with sigmas 4, 5' | 0.0002 |
| 31. 'A difference of Gaussians filter on the Ix image, with sigmas 5, 6' | 0.0062 |
| 32. 'A difference of Gaussians filter on the Iy image, with sigmas 5, 6' | 0.0496 |
| 33. 'A difference of Gaussians filter on the Iz image, with sigmas 5, 6' | 0.5132 |
| 34. 'A difference of Gaussians filter on the Ix image, with sigmas 6, 7' | 0.0111 |
| 35. 'A difference of Gaussians filter on the Iy image, with sigmas 6, 7' | 0.0008 |
| 36. 'A difference of Gaussians filter on the Iz image, with sigmas 6, 7' | 0.0011 |
| 37. 'The mean of a 9 × 9 × 9 window around the pixel (for pruning computations)' | 0.0146 |
| 38. 'The mean of a 9 × 9 × 9 window of the gradient norm around the pixel' | 2.9842 |

Choosing Imaging Parameters Taking into Account Noise Reduction

In most imaging modalities, it is possible to obtain images with less noise, but at a cost, either financial, or in safety. In CT imaging, for example, noise can be reduced by using a higher x-ray dose, but at the possible cost of increasing the chance of the x-ray dose causing cancer in the patient. The noise level of the image may be chosen, for example, from a tradeoff between having a better image for diagnosing a medical problem, and thereby increasing the chance that the patient can be effectively treated, vs. increasing the chance that the patient will get cancer from the higher x-ray dose.

In MRI, lower noise can be obtained by using a higher static magnetic field. There are no known ill health effects of high static magnetic fields, but MRI devices with higher magnetic field are more expensive to build, fewer hospitals can afford them, and fewer patients will have access to them. The highest field full-body medical MRI devices in common use have bore fields of about 3 tesla, and devices with much higher field would be difficult or impossible to construct at any price with known technology, although smaller devices with higher fields are sometimes used. MRI devices with 1.5 or 2 tesla bore fields are significantly less expensive. Noise in MRI images can also be reduced by using a longer image acquisition time, but there is a limit to the acquisition time that most patients will tolerate, and increasing the acquisition time also decreases the patient throughput for the expensive MRI device, and ultimately limits the number of patients who will have access to it.

Finally, in both CT and MRI, lower noise can be obtained by having a lower resolution, but lower resolution, like higher noise, can also affect the usefulness of the image for diagnosing a medical condition.

Figure 6:
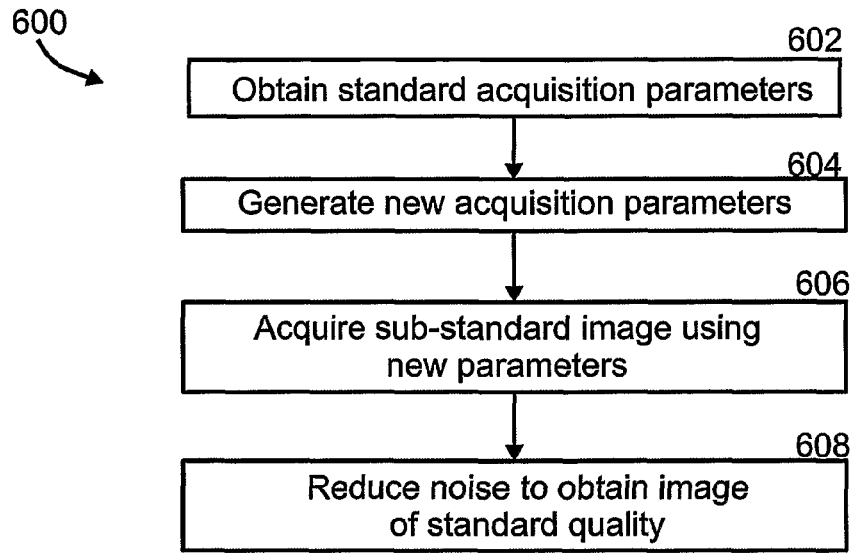
FIG. 6 is a flowchart for a method of acquiring an image using modified acquisition parameters to compensate for noise reduction, since the image can be converted into an image with a normal noise level using the noise reduction method of FIG. 3, according to an exemplary embodiment of the invention.

FIG. 6 shows a flowchart 600, describing a method of choosing imaging parameters, in CT, MRI, or any other imaging modality, which compensate for the ability of noise reduction software, using a method such as that described in FIG. 3, to reduce noise. The method of flowchart 600 is not limited to use with the new noise reduction methods described in FIG. 3 and elsewhere in the present application. It can also be used with prior methods of noise reduction, such as those described in FIGS. 1A through 2A, or any other method of noise reduction, known at present, or known in the future.

At 602, standard acquisition parameters are obtained, for example x-ray dose and resolution in the case of CT, or magnetic field, acquisition time, and resolution in the case of MRI, that would produce a desired noise level. These parameters may be part of the standard operating instructions for a given imaging device, but they may also depend on the presence or absence of contrast agents, on whether the image is being made for health screening purposes, where a lower quality image might be justified, or for examining a known medical problem, and on the resolution and noise level needed to diagnose a particular condition.

At 604, new acquisition parameters are found, using a look-up table for example, that would give the same noise level after using the noise reduction software, at least in those parts of the image where noise level is critical for diagnosis. Such a look-up table could be created, for example, by simulations or by tests with real images, using the best available set of features for noise reduction, for a given imaging modality, as a function of the standard acquisition parameter, or equivalently as a function of the desired final noise level. The tests or simulations could also be done for a range of resolutions, or alternatively it could simply be assumed that the relative noise level scales with the inverse square root of the voxel volume or pixel area, which would be true if the noise in different pixels were uncorrelated.

At 606, an image is acquired using the new parameters, which will have more than the desired noise level, but will, for example, use a lower x-ray dose in the case of a CT image or other x-ray image, or a lower magnetic field and/or a shorter acquisition time, in the case of an MRI image. At 608, the noise in the image is reduced using the noise reduction software, resulting in an image with the same noise level, or the same usefulness for medical diagnosis, as would be produced by the standard acquisition parameters without noise reduction.

Using Residual Image

Figure 7:
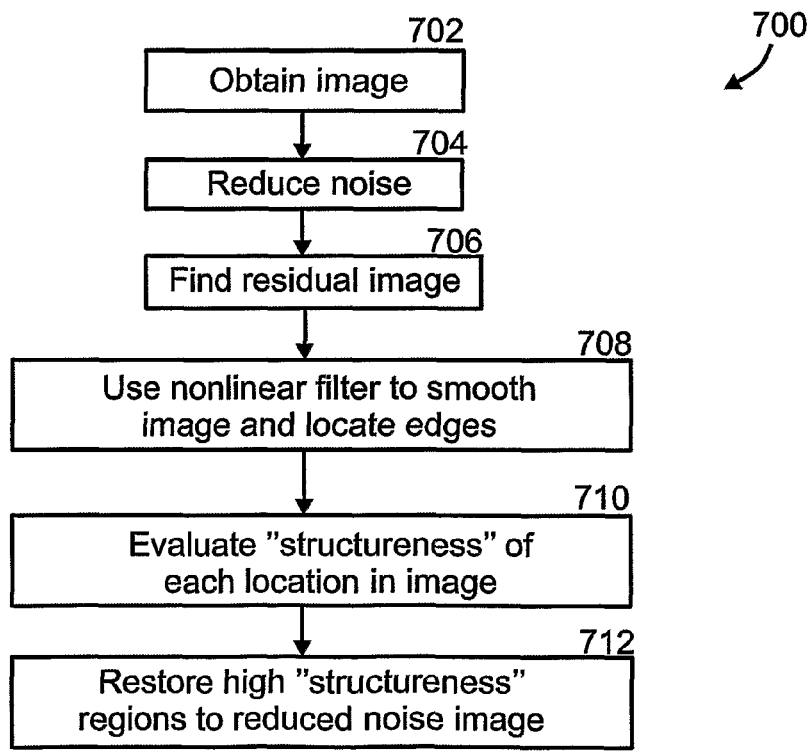
FIG. 7 is a flowchart for a method of examining a residual image after noise reduction for any structure that was incorrectly removed from the original image, and restoring highly structured parts to the reduced noise image, according to an exemplary embodiment of the invention.

FIG. 7 shows a flowchart 700 for using a residual image, which is the difference between the original image and the reduced noise image, to restore some non-noise portions of the original image that may have been removed by the noise reduction software, according to an exemplary embodiment of the invention. The method of flowchart 700 may also be useful for evaluating and, by feedback, improving the noise reduction method. At 702, an original noisy image is obtained. At 704, noise is removed from the image using a noise reduction method, as described for example in FIG. 3, or any other noise reduction method described herein, or in the prior art, or any noise reduction method that may be invented in the future. At 706, a residual image is produced by subtracting the reduced noise image from the original image. Ideally, the residual image would be purely noise. In practice, however, there is usually some low contrast structure in the residual image, indicating that the noise reduction did not remove only noise, but also some structure in the original image. In particular, small scale structure may be disproportionately removed from the original image, as a result of the noise reduction.

It should be noted that, depending on the imaging modality, even true noise may differ in amplitude or other characteristics from place to place in the image, resulting in possible large scale structure in the residual image, even if only noise was removed from the original image. To avoid interpreting that large scale structure as structure that was improperly removed from the original image, the method FIG. 7 is optionally only done to a portion of the image at a time, within which the noise is homogeneous, or within which the noise level is relatively low.

At 708, a nonlinear edge-preserving filter is used to smooth the residual image and locate edges. This filter reduces the noise in the residual image, and smoothes edges parallel to the surface of the edge, relatively enhancing any structure the residual image contains from the original image. Suitable filters include nonlinear anisotropic flow filters, such as the Beltrami flow and coherence-enhancement filters, as described for example by J. Weickert, "Anisotropic diffusion processing," Teubner 1998, and J. Weickert, "Coherence enhancing diffusion filtering," International Journal of Computer Vision 31, no. 2-3, pp. 111-128 (1999).

At 710, a "structureness" parameter is evaluated at a function of position in the filtered residual image, which has a higher value if the image has a coherent structure at that point. There are many parameters that may be used for this purpose. For example, the eigenvalues of the structure tensor or the eigenvalues of the Hessian matrix may be used. At 712, parts of the filtered residual image with higher values of "structureness" are restored to the noise reduced image, to produce an improved noise reduced image.

Use of Correlation Matrix in Distance Measure

Figure 8:
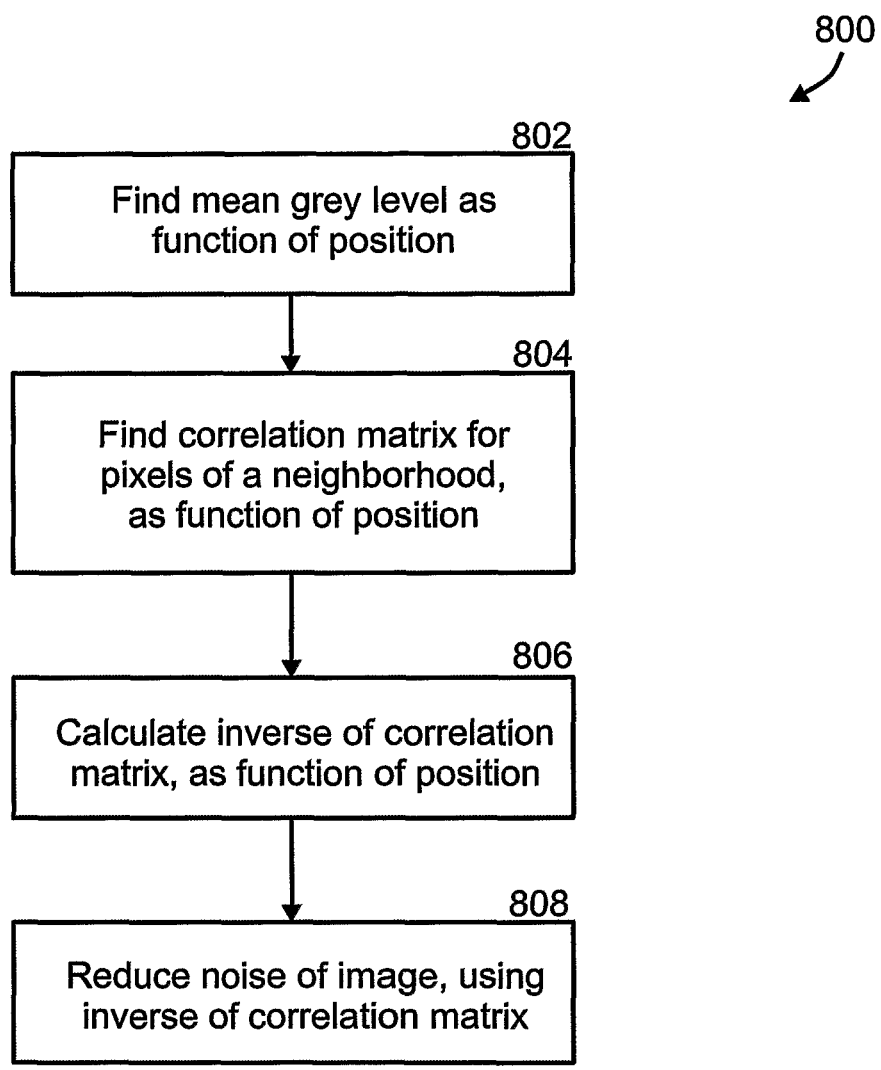
FIG. 8 is a flowchart for a method of finding a correlation matrix and using it to find the distance measure in the method of FIG. 3, according to an exemplary embodiment of the invention.

FIG. 8 shows a flowchart 800 of a method for reducing noise in an image, using a different expression for the distance measure $d(F_1, F_2)$ than that given above. The new expression is in some respects a generalization of the expression given above, in that it takes into account possible correlations between different feature values. We consider only the case where $\beta=2$, in which case the expression above becomes $$d(F_1, F_2) = [\alpha_1(f_1^1 - f_1^2)^2 + \alpha_2(f_2^1 - f_2^2)^2 + \ldots + \alpha_k(f_k^1 - f_k^2)^2]^{1/2}$$

The new expression for $d(F_1, F_2)$ also includes cross-terms between the different features, taking into account correlations between the different feature values. A potential advantage of the new expression for $d(F_1, F_2)$ is that it remains unchanged if the set of feature values is replaced by a set of the same number of new feature values each defined as an independent linear combination of the old feature values. Since the new set of feature values would contain all of the information in the old set of feature values, the new expression for $d(F_1, F_2)$ in some sense depends only on the information in the feature values, and not on the particular way the features are defined. Another potential advantage of the new expression for $d(F_1, F_2)$ is that the weight vector coefficients $\alpha$, and the cross-term coefficients as well, can depend on the location in the image, and need not be the same everywhere, reflecting a different level of noise, and different noise correlations, at different locations in the image. For example, in a CT image, the noise level is generally different in different parts of the image, due to the way the image is formed by intersecting 1-D or 2-D projections. In an MRI image, the noise level may be non-uniform depending on the local intensity of the RF fields, as well as on possible inhomogeneities in the static magnetic field and in the gradient fields. It may be advantageous to give less weight to pixels from a noisier part of the image, in using the grey values of similar pixels to estimate what the true grey value would be, without noise, for a given pixel.

The distance measure found in FIG. 8 depends on a correlation matrix $\Sigma$ between the different feature values. This will be illustrated for the case where the feature values are the grey values of individual pixels in a neighborhood of the pixel for which the features are being found. In this case, for equal weights $\alpha$, the expression for $d(F_1, F_2)$ above is just the mean square error used in the non-local means method.

The matrix coefficients $\Sigma_{mn}$ between the m-th pixel in the neighborhood and the n-th pixel in the neighborhood are given by $$\Sigma_{mn} = E[(I_m - \mu)(I_n - \mu)]$$

where $I_m$ and $I_n$ are the grey values of the m-th and n-th pixel in the neighborhood, $\mu$ is the mean grey value of all pixels in the neighborhood, and the E means the expectation value. Optionally, the coefficients $\Sigma_{mn}$ are found by measuring the grey levels in the image of a uniform phantom, so that local differences between grey levels and mean grey level are due only to noise. Expressing the grey values of a neighborhood as a vector N, the correlation matrix $\Sigma$ may be expressed in vector notation as $$\Sigma = E[(N - \mu)^T (N - \mu)]$$

where $\mu$ represents a vector whose elements are all equal to $\mu$.

A mean grey value $\mu$ is found for different regions of the image, at 802. At 804, the coefficients of the correlation matrix, for example $\Sigma_{mn}$ as defined above, are found for different regions of the image. The regions in this case are optionally much smaller than the whole image but much larger than a pixel. Optionally, the coefficients $\Sigma_{mn}$ are assumed to vary smoothly with position, and interpolation is used to evaluate them between regions.

The distance measure between a pixel i and a search pixel j is given by $$d_\Sigma(N_i, N_j) = [(N_i - N_j)^T \cdot \Sigma^{-1} \cdot (N_i - N_j)]^{1/2}$$

Here, $N_i$ and $N_j$ are vectors representing the grey values of the pixels in the neighborhood around pixel i and the neighborhood around pixel j respectively. Note that i and j are not indexes labeling the elements of $N_i$ and $N_j$, but are indexes labeling the two pixels whose abstract distance from each other, based on resemblance of their neighborhoods, is being defined, for example the pixel i being examined in the noise reduction algorithm, and the search pixel j. $\Sigma^{-1}$ is the inverse of the correlation matrix $\Sigma$.

At 806, the inverse of $\Sigma$ is calculated. Optionally, to reduce computation time when the neighborhoods have a lot of pixels, and the matrix is consequently very large, the inverse is approximated by $$\Sigma^{-1} \approx \sum_n \lambda_n V_n V_n^T$$

where $\lambda_n$ is the inverse of the n-th eigenvalue, and $V_n$ is the corresponding eigenvector, of $\Sigma$. If only the few largest eigenvalues and their corresponding eigenvectors are used, a good approximation to the inverse of $\Sigma$ can be found quickly. Then the distance measure is $$d_\Sigma(N_i, N_j) \approx \left( \sum_n \lambda_n [(N_i - N_j) \cdot V_n]^2 \right)^{1/2}$$

where the sum is over the eigenvectors. In effect, this distance measure behaves like the previously defined abstract distance measure between pixels i and j, with the features each defined as $N_i \cdot V_n$ for one of the eigenvectors $V_n$, i.e. a particular linear combination of the grey values of pixels in the neighborhood, with weight a given by the corresponding eigenvalue $\lambda_n$.

Estimating the Noise Level of a Pixel

Since, as noted above, the noise level often varies with location in the image, optionally search pixels j in a noisy region contribute relatively less to the estimated true grey value of pixel I, for example by giving them a lower weight $W_j$ than search pixels in a lower noise region. Optionally, the noise level of a given region is estimated by measuring the correlation between nearby pixels in an image of a uniform phantom, as described above. An alternative method, which provides not only an estimate of the magnitude of the noise of a given pixel but also an estimate of the sign of the noise, will be described now. This estimate of the noise of each pixel can not only be used to lower the weight $W_j$ for higher noise search pixels, in using the noise reduction method of FIG. 3, but can also be used directly to reduce noise, by subtracting the estimated noise from each pixel. The resulting image is optionally used by itself as a reduced noise image, or it is combined, for example by taking a weighted average, with a reduced noise image found by the method of FIG. 3, or by any other method of noise reduction.

Figure 9:
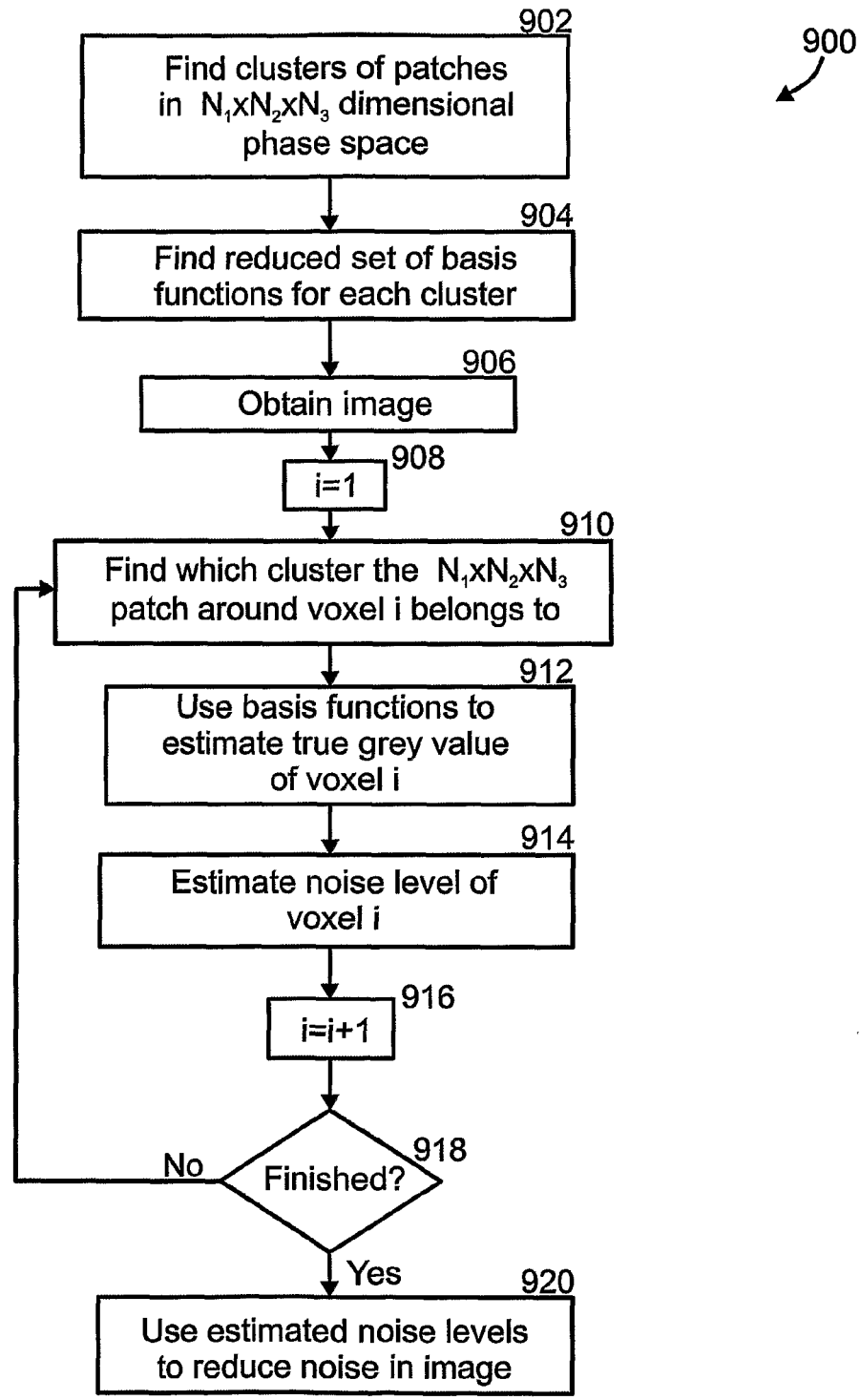
FIG. 9 is a flowchart for a method of estimating the noise of a given voxel of an image, according to an exemplary embodiment of the invention.

This method of estimating the noise of a voxel is described by flowchart 900 of FIG. 9. The method is based on the idea that, in a noise-free image, almost all patches of pixels, of the right size, are likely to occupy only a very small fraction of the full vector space of patches of that size, treating each patch as a vector of grey values. Once this occupied part of the vector space is defined, any deviation from it is assumed to be due to noise.

In 902, a set of one or more low noise test images are examined, optionally similar to the ones that the method is to be used for, for example using the same imaging modality, optionally with similar image acquisition parameters, and/or looking at the same part of the body if they are medical images. In the example shown in FIG. 9, the images are 3-D, so the pixels are referred to as voxels, but the method can be used for 2-D images as well. In each of the test images, a set of patches of voxel dimensions $N_1 \times N_2 \times N_3$ is examined, optionally consisting of all sets of patches with those dimensions in the test images. Each patch may be represented as a vector of grey values in an abstract $N_1 \times N_2 \times N_3$-dimensional vector space, whose dimensions each represent the possible grey values of one of the voxels of an $N_1 \times N_2 \times N_3$ patch. The patches of the images are sorted into clusters in this vector space, using any clustering algorithm known in the art. The number of clusters is, for example, between 20 and 100, or between 100 and 500, or between 500 and 2000, or less than 20, or more than 2000. Using a larger number of clusters requires examining more patches to get good statistics as to how the vector space is divided into clusters, and hence requires more computation time to sort the patches, but using too small a number of clusters may cause the clusters to cover too much of the vector space, and to be less useful for reducing noise. The inventors have found that using a few hundred clusters works well, when the patch dimensions are between 5 and 10 voxels, or between 10 and 15 voxels, or less than 5 voxels, or more than 15 voxels. In particular, a patch of 11×11×11 voxels appears to work well.

Although in the example given above the patches are in the shape of a rectangular array, the patches need not be of this shape, but can have any well-defined shape in voxels. The dimensionality of the vector space is the number of voxels in a patch.

In 904, each cluster is examined to find a limited set of independent parameters, significantly fewer than the $N_1 \times N_2 \times N_3$ linear coefficients of basis vectors needed to cover the full vector space, which to a fairly good approximation covers the patches in that cluster. For example, each of the patches in the cluster, or the great majority of them, is well approximated as a vector of grey values that is fixed for all patches in the cluster, plus a linear combination of a limited set of basis vectors, with coefficients that differ for different patches in the cluster. Alternatively, the great majority of patches in the cluster is well approximated by the fixed vector of grey values plus a function, not necessarily linear, of a limited number of independent parameters. The number of basis vector coefficients, or other independent parameters, need not be the same for all clusters. The number of basis vectors, or independent parameters, used for a given cluster is, for example, typically less than three-quarters of $N_1 \times N_2 \times N_3$, or less than half of $N_1 \times N_2 \times N_3$, or less than a quarter of $N_1 \times N_2 \times N_3$, or less than an eighth of $N_1 \times N_2 \times N_3$, or more than three-quarters of $N_1 \times N_2 \times N_3$. Some of the clusters may have more basis vectors or more independent parameters than the typical number. The goal is to identify a small fraction of phase space that provides a good approximation to most of the patches in the cluster. Nonlinear methods of representing patch vectors include, but are not limited to, kernel PCA, Laplacian eigenmaps, and diffusion maps.

At 906, an image is obtained for noise reduction. Once the clusters of patches and the basis functions or set of parameters have been found in 902 and 904, they do not have to be found again for processing additional images, but the procedure can begin with 906.

At 908, a loop over image voxels i begins, setting a voxel index i equal to 1. The patch around the first voxel is examined (the patches are defined relative to one of their voxels) at 910, and it is determined which cluster the patch belongs to. Alternatively, as is also possible in the method of FIG. 3, groups of voxels are examined together, instead of examining only one voxel i at a time, and patches are defined relative to a group of their voxels, or relative to a virtual voxel interpolated between voxels. If the patches are suitably chosen, and the test images are sufficiently representative of the image being processed, and the test images are not very noisy but are dominated by well-defined structures, and the image being processed is not dominated by noise, then the great majority of the patches of the image being processed may fall cleanly into one cluster or another. If one or more of these conditions is not satisfied, the method may still be useful, but may be less effective at reducing noise.

At 912, coefficients for the basis functions, or the other independent parameters, for that cluster are found, which provide the best approximation, or at least a reasonably good approximation, to the patch for voxel i. The better the approximation is for most patches, the better the noise reduction may be, because the method assumes that any difference between the observed grey values and this approximation is due only to noise. At 914, the noise component of the grey value of voxel i is estimated, by taking the difference between the actual grey value of voxel i, and the grey value that voxel i would have using the approximation in terms of the fixed vector for that cluster plus a linear combination of the limited set of basis functions, or the function of a limited set of independent parameters. The rationale for this procedure is that, in the absence of noise, the patch would be likely to be well described by this approximation, which works well for all or most of the patches in this cluster found in the test images, so any difference is likely to be due largely to noise.

At 916, the voxel index i is increased by 1. At 918, it is determined whether all of the voxels in the image have been examined. If not, the next voxel is examined at 910. If all voxels have been examined, then the procedure ends at 920 with the estimated noise of each voxel as output. Optionally, the estimated noise is then used to reduce the noise of the image, either directly by subtracting the estimated noise from the image, or indirectly, for example by using the estimated noise level to affect the weights $W_j$ when using the noise reduction method of FIG. 3, or by using a combination of both methods.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method of reducing noise in an image, comprising:
   a) for each pixel being examined in the image, selecting a set of search pixels;
   b) calculating a value of at least a first feature of a first neighborhood of each search pixel, and a value of a corresponding feature of a corresponding neighborhood of the pixel being examined;
   c) calculating a value of at least a second feature of a second neighborhood of each search pixel, the same as or different from the first neighborhood, and a value of a corresponding feature of a corresponding neighborhood of the pixel being examined;
   d) calculating a reduced noise grey value for each pixel being examined, based on raw or transformed grey values of the search pixels of each pixel being examined, with greater sensitivity to those with one or more feature values similar to those of the pixel being examined;
   e) assigning a patch of pixels in the image, represented as a vector of grey levels, to one out of a plurality of clusters in a vector space of the plurality of clusters;
   f) approximating the patch of pixels as a function of a reduced set of independent parameters, fewer than the number pixels in the patch of pixels, associated with said one cluster; and
   g) correcting a grey level of a pixel of the patch of pixels according to a difference between actual grey levels of the patch of pixels and the approximation of the patch of pixels as a function of the reduced set of independent parameters;
   wherein calculating the value of at least the first feature comprises calculating a characteristic of a distribution of raw or transformed grey values of pixels in the neighborhood, other than a mean grey value of all pixels in the neighborhood, and calculating the value of at least the second feature comprises evaluating a transform of the image in the neighborhood, or an effect of a filter on the image in the neighborhood, that preferentially selects structures of a range of scales intermediate between the size of the neighborhood and a few pixels, or of some orientations over other orientations, or both.

2. A method according to claim 1, wherein calculating the value of the first feature comprises calculating a second or higher moment of the distribution.

3. A method according to claim 1, wherein, for calculating the value of the first feature, the grey values of pixels in the neighborhood are raw grey values of the image for those pixels.

4. A method according to claim 1, wherein calculating the value of the first feature also comprises calculating at least one characteristic of a distribution of grey values of the pixels in a second neighborhood that is a proper sub-set of the first neighborhood of the search pixel.

5. A method according to claim 1, wherein calculating the value of the second feature comprises evaluating a response of a linear filter to the image.

6. A method according to claim 5, wherein the linear filter is a directional filter.

7. A method according to claim 1 wherein calculating the value of the second feature comprises evaluating a nonlinear morphological transform of the image in the second neighborhood of the search pixel.

8. A method according to claim 1, wherein the dependence of the value of the second feature on angle of orientation of the neighborhood has a symmetry such that the value of the second feature is substantially unchanged if the neighborhood is rotated by at least one angle, for any grey values of the image pixels in the neighborhood.

9. A method according to claim 1, wherein for at least the second feature, the corresponding feature values of the pixel being examined and the search pixel are calculated with their neighborhoods at different relative orientations or scales or both.

10. A method according to claim 1, wherein the reduced noise grey value is based on a weighted average of grey values of the search pixels.

11. A method according to claim 10, wherein the weighted average uses weights that depend on a measure of differences between the first and/or second feature values of the search pixel and the corresponding first and/or second feature values of the pixel being examined.

12. A method according to claim 1, also including:
a) identifying a relatively more structured portion of a residual image representing changes from the original image to the noise reduced image; and
b) restoring the structured portion to the noise reduced image to produce an improved noise reduced image.

13. A method according to claim 1, also including estimating a noise level of one or more of the search pixels, wherein the reduced noise grey value is less dependent on, or not dependent on, search pixels with higher estimated noise levels.

14. A method according to claim 1, wherein the function is a linear combination of a reduced set of basis vectors, and the independent parameters are the coefficients of the basis vectors in the linear combination.

15. A method according to claim 1, wherein calculating the value of the first or second feature comprises finding a grey value corresponding to a given percentile of the distribution of grey values.

16. A method according to claim 1, wherein the image comprises a medical image.

17. A method of reducing noise in an image, comprising:
a) for each pixel being examined in the image, selecting a set of search pixels;
b) calculating a value of one or more features of a neighborhood of each search pixel, and a value of corresponding features of a neighborhood of the pixel being examined;
c) calculating a reduced noise grey value for each pixel being examined, based on raw or transformed grey values of the search pixels of each pixel being examined, with greater sensitivity to those with one or more feature values similar to those of the pixel being examined;
d) assigning a patch of pixels in the image, represented as a vector of grey levels, to one out of a plurality of clusters in a vector space of the plurality of clusters;
e) approximating the patch of pixels as a function of a reduced set of independent parameters, fewer than the number pixels in the patch of pixels, associated with said one cluster; and
f) correcting a grey level of a pixel of the patch of pixels according to a difference between actual grey levels of the patch of pixels and the approximation of the patch of pixels as a function of the reduced set of independent parameters,
wherein calculating the value of at least one feature comprises calculating a characteristic of a distribution of raw or transformed grey values of pixels in the neighborhood, other than a mean grey value, or a standard deviation of grey values, of all pixels in the neighborhood.

18. A method of reducing noise in an image, comprising:
a) for each pixel being examined in the image, selecting a set of search pixels;
b) calculating a value of one or more features of a neighborhood of each search pixel, and a value of corresponding features of a neighborhood of the pixel being examined;
c) calculating a reduced noise grey value for each pixel being examined, based on raw or transformed grey values of the search pixels of each pixel being examined, with greater sensitivity to those with one or more feature values similar to those of the pixel being examined;
d) assigning a patch of pixels in the image, represented as a vector of grey levels, to one out of a plurality of clusters in a vector space of the plurality of clusters;
e) approximating the patch of pixels as a function of a reduced set of independent parameters, fewer than the number pixels in the patch of pixels, associated with said one cluster; and
f) correcting a grey level of a pixel of the patch of pixels according to a difference between actual grey levels of the patch of pixels and the approximation of the patch of pixels as a function of the reduced set of independent parameters,
wherein calculating the value of at least one feature comprises evaluating a transform of the image in the neighborhood, or an effect of a filter on the image in the neighborhood, that preferentially selects structures of a range of scales intermediate between the size of the neighborhood and a few pixels, or of some orientations over other orientations, or both, but calculating the value of said feature does not comprise finding a direction of average gradient of grey values for the neighborhood.

* * * * *